(12) United States Patent
Grossman et al.

(10) Patent No.: US 9,910,993 B2
(45) Date of Patent: Mar. 6, 2018

(54) SIMULATION AND VIRTUAL REALITY BASED CYBER BEHAVIORAL SYSTEMS

(71) Applicant: IronNet Cybersecurity, Inc., Fulton, MD (US)

(72) Inventors: Robert L. Grossman, River Forest, IL (US); Keith B. Alexander, Fulton, MD (US); James E. Heath, Sugar Loaf Key, FL (US); Randy Lynn Garrett, Clifton, VA (US)

(73) Assignee: IronNet Cybersecurity, Inc., Fulton, MD (US)

( * ) Notice: Subject to any disclaimer, the term of this patent is extended or adjusted under 35 U.S.C. 154(b) by 0 days.

(21) Appl. No.: 15/612,381

(22) Filed: Jun. 2, 2017

(65) Prior Publication Data

US 2018/0018462 A1    Jan. 18, 2018

Related U.S. Application Data

(60) Provisional application No. 62/362,346, filed on Jul. 14, 2016.

(51) Int. Cl.
*H04L 29/06* (2006.01)
*G06F 21/57* (2013.01)
(Continued)

(52) U.S. Cl.
CPC .......... *G06F 21/577* (2013.01); *G06F 21/55* (2013.01); *H04L 63/14* (2013.01);
(Continued)

(58) Field of Classification Search
CPC ........ G06F 21/50; G06F 21/55; G06F 21/552; G06F 21/554; H04L 63/14;
(Continued)

(56) References Cited

U.S. PATENT DOCUMENTS 6,088,804 A    7/2000  Hill et al.
6,134,664 A   10/2000  Walker
(Continued)

FOREIGN PATENT DOCUMENTS

WO    WO-2007/070838 A2    6/2007

OTHER PUBLICATIONS

Denning, D. E., "An Intrusion-Detection Model," IEEE Transactions on Software Engineering, vol. SE-13, No. 2, pp. 222-232 (Feb. 1987).

(Continued)

*Primary Examiner* — Edward Zee
(74) *Attorney, Agent, or Firm* — Wilmer Cutler Pickering Hale and Dorr LLP

(57) ABSTRACT

A cybersecurity system for managing cyber behavior associated with cyber actors such that the cyber behavior can be computed and predicted and cyber interactions between the cyber actors can be created. The system includes a cyber behavioral space management module configured to receive input data, and data from the interaction engine and the analytic workflow engine, and to generate a plurality of cyber behavioral spaces based on the received data. The system includes an interaction engine configured to process cyber actor data to facilitate interactions with the cyber behavioral space, a cyber scene, a cyber map, and another cyber actor. The system includes an analytic workflow engine configured to analyze the cyber behavioral spaces and update cyber data based on the analyzed data and the interaction engine data. The system includes a visualization engine configured to compute visualizations and transmit the visualizations for display.

24 Claims, 7 Drawing Sheets

(51) Int. Cl.
*G06F 21/55* (2013.01)
*G06T 19/00* (2011.01)

(52) U.S. Cl.
CPC ...... *H04L 63/1408* (2013.01); *H04L 63/1425* (2013.01); *A63F 2300/5553* (2013.01); *G06T 19/006* (2013.01)

(58) Field of Classification Search
CPC ............. H04L 63/1408; H04L 63/1416; H04L 63/1425; H04L 63/1433; H04L 63/1441
See application file for complete search history.

(56) References Cited

U.S. PATENT DOCUMENTS

| | | |
|---|---|---|
| 6,279,113 B1 | 8/2001 | Vaidya |
| 6,484,203 B1 | 11/2002 | Porras et al. |
| 6,519,703 B1 | 2/2003 | Joyce |
| 6,597,660 B1 | 7/2003 | Rueda et al. |
| 6,671,811 B1 | 12/2003 | Diep et al. |
| 6,769,066 B1 | 7/2004 | Botros et al. |
| 7,290,283 B2 | 10/2007 | Copeland, III |
| 7,331,061 B1 | 2/2008 | Ramsey et al. |
| 7,346,803 B2 | 3/2008 | Ide et al. |
| 7,386,883 B2 | 6/2008 | Bardsley et al. |
| 7,406,606 B2 | 7/2008 | Chawla et al. |
| 7,454,792 B2 | 11/2008 | Cantrell et al. |
| 7,458,094 B2 | 11/2008 | Jackson |
| 7,571,478 B2 | 8/2009 | Munson et al. |
| 7,594,260 B2 | 9/2009 | Porras et al. |
| 7,603,711 B2 | 10/2009 | Scheidell |
| 7,694,115 B1 | 4/2010 | Porras et al. |
| 7,739,082 B2 | 6/2010 | Scherrer |
| 7,770,203 B2 | 8/2010 | McKenna |
| 7,809,740 B2 | 10/2010 | Chung et al. |
| 7,814,548 B2 | 10/2010 | Mukhopadhyay et al. |
| 7,840,377 B2 | 11/2010 | Ramsey et al. |
| 7,934,254 B2 | 4/2011 | Graham |
| 8,015,133 B1 | 9/2011 | Wu et al. |
| 8,056,130 B1 | 11/2011 | Njemanze et al. |
| 8,079,080 B2 | 12/2011 | Borders |
| 8,135,830 B2 | 3/2012 | McClure et al. |
| 8,185,955 B2 | 5/2012 | Cangini et al. |
| 8,205,259 B2 | 6/2012 | Stute |
| 8,296,850 B2 | 10/2012 | Srinivasa et al. |
| 8,326,987 B2 | 12/2012 | Lin |
| 8,392,997 B2 | 3/2013 | Chen et al. |
| 8,424,091 B1 | 4/2013 | Su et al. |
| 8,443,443 B2 | 5/2013 | Nordstrom et al. |
| 8,458,793 B2 | 6/2013 | McKenna |
| 8,473,415 B2 | 6/2013 | Siegel et al. |
| 8,527,776 B2 | 9/2013 | Botros et al. |
| 8,528,091 B2 | 9/2013 | Bowen et al. |
| 8,620,028 B2 | 12/2013 | Eaton et al. |
| 8,631,464 B2 | 1/2014 | Belakhdar et al. |
| 8,640,234 B2 | 1/2014 | Gassen et al. |
| 8,707,431 B2 | 4/2014 | Stephens et al. |
| 8,769,684 B2 | 7/2014 | Stolfo et al. |
| 8,863,279 B2 | 10/2014 | McDougal et al. |
| 8,887,281 B2 | 11/2014 | Honig et al. |
| 8,887,286 B2 | 11/2014 | Dupont et al. |
| 8,898,784 B1 | 11/2014 | Alexander et al. |
| 8,973,140 B2 | 3/2015 | Shnowske et al. |
| 8,989,880 B2 | 3/2015 | Wohl et al. |
| 9,032,521 B2 | 5/2015 | Amini et al. |
| 9,038,180 B2 | 5/2015 | Neil |
| 9,043,587 B1 | 5/2015 | Chen et al. |
| 9,043,905 B1 | 5/2015 | Allen et al. |
| 9,049,224 B2 | 6/2015 | Lin |
| 9,306,965 B1 | 4/2016 | Grossman et al. |
| 2003/0051026 A1 | 3/2003 | Carter et al. |
| 2004/0133672 A1 | 7/2004 | Bhattacharya et al. |
| 2006/0191010 A1 | 8/2006 | Benjamin |
| 2006/0200559 A1 | 9/2006 | Ling et al. |
| 2007/0204345 A1 | 8/2007 | Pereira et al. |
| 2007/0245420 A1 | 10/2007 | Yong et al. |
| 2009/0024549 A1 | 1/2009 | Johnson |
| 2009/0083855 A1 | 3/2009 | Apap et al. |
| 2012/0072983 A1 | 3/2012 | McCusker et al. |
| 2012/0110635 A1 | 5/2012 | Harvey et al. |
| 2012/0137367 A1 | 5/2012 | Dupont et al. |
| 2012/0296669 A1 | 11/2012 | Hudgins et al. |
| 2013/0031633 A1 | 1/2013 | Honig et al. |
| 2013/0347060 A1 | 12/2013 | Hazzani |
| 2014/0007238 A1 | 1/2014 | Magee et al. |
| 2015/0026061 A1 | 1/2015 | Siegel et al. |
| 2015/0295948 A1* | 10/2015 | Hassell ............... H04L 63/1433 726/25 |
| 2016/0028758 A1 | 1/2016 | Ellis et al. |
| 2016/0092774 A1 | 3/2016 | Wang et al. |

OTHER PUBLICATIONS

Ghosh, A. K. et al., "Learning Program Behavior Profiles for Intrusion Detection," USENIX The Advanced Computing Systems Association, Proceedings of the Workshop on Intrusion Detection and Network Monitoring, Santa Clara, California, 13 pages. (Apr. 9-12, 1999).

GitHub, "Update spec to version 0.5—datamininggroup/pfa@8502e36," GitHub, retrieved online URL: <https://github.com/datamininggroup/pfa/commit/8502e36ccd60f133e91d89b84ca9df8ffd0e88d1>, pp. 1-7 (retrieved online Nov. 2, 2015).

Heard, N. A. et al., "Bayesian Anomaly Detection Methods for Social Networks," The Annals of Applied Statistics, vol. 4, No. 2, pp. 645-662 (2010).

International Search Report and Written Opinion issued in the International Application PCT/US15/56082, dated Jun. 30, 2016, 15 pages.

International Search Report and Written Opinion issued in the International Application PCT/US17/35679, dated Aug. 25, 2017, 12 pages.

Neumann, P. G. and Porras, P. A., "Experience with EMERALD to Date," USENIX The Advanced Computing Systems Association, Proceedings of the Workshop on Intrusion Detection and Network Monitoring, Santa Clara, California, 9 pages. (Apr. 9-12, 1999).

Patcha, A. and Park, J.-M., "An overview of anomaly detection techniques: Existing solutions and latest technological trends," Computer Networks, vol. 51, pp. 3448-3470 (2007).

Ryan, J. et al., "Intrusion Detection with Neural Networks," AAAI Technical Report, WS-97-07, pp. 72-77 (1997).

Wagner, D. and Dean, D., "Intrusion detection via Static Analysis," IEEE Symposium on Security and Privacy, Oakland, California, pp. 156-168 (May 14-16, 2001).

Xie, P. et al., "Using Bayesian Networks for Cyber Security Analysis," Conference Paper, 10 pages. (Sep. 2010).

Zanero et al., "Unsupervised learning techniques for an intrusion detection system," Proceedings of the 2004 ACM Symposium on Applied Computing in Nicosia, Cyprus, Mar. 14-17, 2004, pp. 412-419.

Bivens et al., "Network-Based Intrusion Detection Using Neural Networks", Proceedings of the Intelligent Engineering Systems through Artificial Neural Networks Annie-2002, St. Louis, MO, vol. 12, ASME Press, New York, NY, 2002, pp. 579-584.

Ghosh, A. K. et al., "Detecting Anomalous and Unknown Intrusions Against Programs," Proceedings of the 14th Annual Computer Security Applications Conference, Phoenix, Arizona, Dec. 7-11, 1998, pp. 259-267.

Smith, Rasheda, "Network-Based Intrusion Detection Using Neural Networks," Unpublished master thesis: Department of Computer Science, Rensselaer Polytechnic Institute, 2002, 18 pages.

* cited by examiner

SIMULATION AND VIRTUAL REALITY BASED CYBER BEHAVIORAL SYSTEMS

CROSS-REFERENCE TO RELATED APPLICATIONS

This application claims priority to U.S. Provisional Application No. 62/362,346, filed on Jul. 14, 2016, which is incorporated herein by reference.

TECHNICAL FIELD

Some embodiments of the present invention generally relate to cybersecurity, and in particular, simulation and virtual reality based cyber behavioral systems and knowledge sharing between cyber behavioral systems.

BACKGROUND

Traditionally, network defenders review only fragments of information to help understand what is actually happening on their network. It can be extremely difficult and manpower intensive to simulate the entire network in order to look at potential courses of action, defensive maneuvers, and force on force scenarios. Current cybersecurity exercises allow defenders to play against each other, but the exercises do not cover all of the possible scenarios that could occur on the network. Each day, the number and complexity of new threats grow, and it becomes harder and harder for network defenders to keep up with current cyber operational systems.

Generally, companies and organizations work cybersecurity related issues independently. When they do share information, it is usually through industry or government policies and frameworks for facilitating the sharing of cybersecurity related data. The traditional practices for sharing information are not sufficient to handle the volume or the speed of the attacks. It does not allow companies to fully leverage the manpower available to actively defend within a network, nor among networks fighting to defend a sector, multiple sectors, or a nation.

SUMMARY

In accordance with the disclosed subject matter, systems, methods, and non-transitory computer-readable media are provided for providing a cybersecurity system for managing cyber behavior associated with cyber actors such that the cyber behavior can be computed and predicted and cyber interactions between the cyber actors can be created.

In some embodiments, the disclosed subject matter includes a cybersecurity system that includes a cyber behavioral space management module, an interaction engine, an analytic workflow engine, and a visualization engine. In some embodiments, the cyber behavioral space management module is in communication with the interaction engine, the analytic workflow engine, and the visualization engine. In some embodiments, the cyber behavioral space management module is configured to receive at least one of input data, the input data including at least one of input cyber data, sensor data, enrichment data, and third party data, data from the interaction engine, and data from the analytic workflow engine. In some embodiments, the cyber behavioral space management module is configured to generate a plurality of cyber behavioral spaces based on the at least one of the input data, the data from the interaction engine, and the data from the analytic workflow engine, each of the plurality of cyber behavioral spaces comprising cyber behavioral space data.

In some embodiments, the cyber behavioral space data includes cyber data, the cyber data including at least one of the input cyber data and transformed input cyber data, cyber actor data associated with a plurality of cyber actors, and cyber scene data associated with a plurality of cyber scenes, the cyber behavioral space data being defined by a plurality of dimensions, a plurality of modes, and a plurality of scales. In some embodiments, the interaction engine is configured to receive first cyber actor data associated with a first cyber actor of the plurality of cyber actors, the first cyber actor including at least one of a real cyber actor and a simulated actor. In some embodiments, the interaction engine is configured to process the received first cyber actor data to facilitate at least one of a first interaction between the first cyber actor with at least one of the cyber behavioral space, the cyber scene, and a cyber map, the cyber map associated with at least one of the plurality of cyber behavioral spaces, and a second interaction between the first cyber actor with a second cyber actor of the plurality of cyber actors. In some embodiments, the interaction engine is configured to transmit data associated with at least one of the first interaction and the second interaction. In some embodiments, the analytic workflow engine is configured to analyze the cyber behavioral space data associated with each of the plurality of cyber behavioral spaces to compute cyber behaviors, and update at least one of the cyber data, the cyber actor data, and the cyber scene data based on at least one of the cyber behavioral space data, the computed cyber behaviors and an assignment of the computed cyber behaviors to at least one of the cyber data, the cyber actor data, and the cyber scene data, the first interaction, and the second interaction. In some embodiments, the interaction engine is configured to transmit data associated with the updated at least one of the cyber data, the cyber actor data, and the cyber scene data. In some embodiments, the visualization engine is configured to compute visualizations of at least one of the data associated with at least one of the first interaction and the second interaction from the interaction engine, and at least one of the cyber behavioral spaces, the plurality of cyber actors, the plurality of cyber scenes, the plurality of cyber maps, and the computed cyber behaviors, and transmit the visualizations for display.

In some embodiments, the cybersecurity system includes a query engine, in communication with the cyber behavioral space management module, the query engine configured to receive, from the first cyber actor, a query about at least one of the plurality of cyber behavioral spaces. In some embodiments, the query is associated with at least one of risk associated with a first cyber entity of a plurality of cyber entities, a group of cyber entities of the plurality of cyber entities with a similar profile as the first cyber entity, internal or external organizational constructs, and behavior associated at least one of the first cyber entity, each cyber entity in the group of cyber entities, the first cyber actor, the second cyber actor and a third cyber actor. In some embodiments, analytic workflow engine is configured to compute and continuously update risks associated with each cyber entity of the plurality of cyber entities and each cyber actor of the plurality of cyber actors.

In some embodiments, the cybersecurity system includes a simulation engine, in communication with the cyber behavioral space management module, configured to generate the plurality of cyber scenes, each of the plurality of cyber scenes including a subset of the cyber data, the cyber scenes, and the cyber maps associated with the plurality of cyber behavioral spaces. In some embodiments, the simulation engine is configured to generate simulations, the simulations configured to operate on at least one of real world data and simulated data and provide a course of action for at least one of operations, analysis, insight, planning, training, a remediation action, and a mitigation action.

In some embodiments, the analytic workflow engine is configured to create a transformed cyber behavioral space, wherein to create the transformed cyber behavioral space, the analytic workflow engine is further configured to transform the cyber behavioral space data into tensor data and lower rank tensor approximations, and use machine learning to define cyber behaviors and the plurality of cyber behavioral spaces associated with the transformed cyber behavioral space.

In some embodiments, the analytic workflow engine is configured to apply at least one of rules and machine learning to the transformed cyber behavioral space to define cyber behaviors that increase or decrease risk associated with at least one of a real cyber actor or a simulated actor, a cyber entity, a machine, an organization, and a process.

In some embodiments, the cybersecurity system is associated with a first organization, further wherein the cyber behaviors that increase or decrease risk are observable by cyber actors associated with the first organization and unobservable by cyber actors associated with a second organization. In some embodiments, the cybersecurity system includes a cyber behavioral exchange engine, the cyber behavioral exchange engine in communication with the cyber behavioral space management module. In some embodiments, the cyber behavioral exchange engine is configured to transmit the cyber behaviors that increase or decrease risk to a cyber behavioral exchange engine associated with the second organization using at least one of a privacy preserving distributed machine learning algorithm and a privacy preserving communications protocol such that the cyber behaviors that increase or decrease risk can be used to analyze data in the second organization, and the cyber behavioral space data associated with the first organization is unobservable by cyber actors associated with the second organization.

In some embodiments, the cybersecurity system processes first cyber actor data to determine at least one of a first cyber behavior of the cyber behaviors associated with the transformed cyber behavioral space, and a first cyber scene of the plurality of cyber scenes associated with the transformed cyber behavioral space, and improve operational capabilities, readiness, and training associated with responding to the first cyber behavior and the first cyber scene.

In some embodiments, the analytic workflow engine is configured to process at least one of packet data, network traffic, computer logs, signals intelligence, visible, infrared, multi-spectral, hyperspectral, synthetic aperture radar, moving target indicator radar, technical intelligence data, and intelligence reports.

In some embodiments, each of the plurality of cyber behavioral spaces include at least one of a real-time cyber behavioral space, a historical cyber behavioral space, and a simulated cyber behavioral space. In some embodiments, cyber behavior includes at least one of initial reconnaissance, scanning, initial compromise, establishing a foothold, beaconing, command and control, credential capture, escalating privileges, internal reconnaissance, lateral motion, network mapping, data exfiltration, maintaining persistence, and related behaviors. In some embodiments, the plurality of dimensions include a combination of source and destination addresses, time of arrival, volume, packet size, and a protocol type, the plurality of modes include a combination of packet data, network traffic, computer logs, signals intelligence, visible, infrared, multi-spectral, hyperspectral, synthetic aperture radar, moving target indicator radar, technical intelligence data, and intelligence reports, and the plurality of scales include a combination of temporal multi-scale data and geo-spatial data.

In some embodiments, the cyber behavioral space management module is configured to receive sensor data, the sensor data including at least one of physical actor sensor data about a physical actor and physical system sensor data about a physical system, and at least one of input data, the input data including at least one of input cyber data, enrichment data, and third party data, data from the interaction engine, and data from the analytic workflow engine. In some embodiments, the cyber behavioral space management module is configured to generate a plurality of cyber behavioral spaces based on the sensor data and at least one of the input data, the data from the interaction engine, and the data from the analytic workflow engine, each of the plurality of cyber behavioral spaces comprising cyber behavioral space data.

In some embodiments, the cyber behavioral space data includes cyber data, the cyber data including at least one of the input cyber data and transformed input cyber data, cyber actor data associated with a plurality of cyber actors, and cyber scene data associated with a plurality of cyber scenes. In some embodiments, the cyber behavioral space data is defined by a plurality of dimensions, a plurality of modes, and a plurality of scales. In some embodiments, the interaction engine configured to receive first cyber actor data associated with a first cyber actor of the plurality of cyber actors, the first cyber actor including at least one of a real cyber actor and a simulated actor. In some embodiments, the interaction engine is configured to process the received first cyber actor data to facilitate at least one of a first interaction between the first cyber actor with at least one of the cyber behavioral space, the cyber scene, and a cyber map, the cyber map associated with at least one of the plurality of cyber behavioral spaces, and a second interaction between the first cyber actor with a second cyber actor of the plurality of cyber actors. In some embodiments, the interaction engine is configured to transmit data associated with at least one of the first interaction and the second interaction. In some embodiments, the analytic workflow engine is configured to analyze the cyber behavioral space data associated with each of the plurality of cyber behavioral spaces to compute cyber behaviors, and update at least one of the cyber data, the cyber actor data, and the cyber scene data based on at least one of the cyber behavioral space data, the computed cyber behaviors and an assignment of the computed cyber behaviors to at least one of the cyber data, the cyber actor data, and the cyber scene data, the first interaction, the second interaction, and a computation of physical behaviors about at least one of the physical system and the physical actor. In some embodiments, the interaction engine is configured to transmit data associated with the updated at least one of the cyber data, the cyber actor data, and the cyber scene data. In some embodiments, the visualization engine is configured to compute visualizations of at least one of the data associated with at least one of the first interaction and the second interaction from the interaction engine, and at least one of the cyber behavioral spaces, the plurality of cyber actors, the plurality of cyber scenes, the plurality of cyber maps, and the computed cyber behaviors. In some embodiments, the visualization engine is configured to transmit the visualizations for display.

In some embodiments, the cybersecurity system that is configured to receive sensor data includes a query engine, in communication with the cyber behavioral space management module. In some embodiments, the query engine is configured to receive, from the first cyber actor, a query about at least one of the plurality of cyber behavioral spaces. In some embodiments, the query is associated with at least one of risk associated with a first cyber entity of a plurality of cyber entities, a group of cyber entities of the plurality of cyber entities with a similar profile as the first cyber entity, internal or external organizational constructs, and behavior associated at least one of the first cyber entity, each cyber entity in the group of cyber entities, the first cyber actor, the second cyber actor and a third cyber actor. In some embodiments, the analytic workflow engine is configured to compute and continuously update risks associated with each cyber entity of the plurality of cyber entities and each cyber actor of the plurality of cyber actors.

In some embodiments, the cybersecurity system that is configured to receive sensor data includes a simulation engine, in communication with the cyber behavioral space management module, the simulation engine. In some embodiments, the simulation engine is configured to generate the plurality of cyber scenes, each of the plurality of cyber scenes including a subset of the cyber data, the cyber scenes, and the cyber maps associated with the plurality of cyber behavioral spaces. In some embodiments, the simulation engine is configured to generate simulations. In some embodiments, the simulations are configured to operate on at least one of real world data and simulated data, and provide a course of action for at least one of operations, analysis, insight, planning, training, a remediation action, and a mitigation action.

In some embodiments, the analytic workflow engine associated with the cybersecurity system that is configured to receive sensor data is configured to create a transformed cyber behavioral space. In some embodiments, wherein to create the transformed cyber behavioral space, the analytic workflow engine is configured to transform the cyber behavioral space data into tensor data and lower rank tensor approximations, and use machine learning to define cyber behaviors and the plurality of cyber behavioral spaces associated with the transformed cyber behavioral space.

In some embodiments, the analytic workflow engine associated with the cybersecurity system that is configured to receive sensor data is configured to apply at least one of rules and machine learning to the transformed cyber behavioral space to define cyber behaviors that increase or decrease risk associated with at least one of a real cyber actor or a simulated actor, a cyber entity, a machine, an organization, and a process.

In some embodiments, the cybersecurity system that is configured to receive sensor data is associated with a first organization, further wherein the cyber behaviors that increase or decrease risk are observable by cyber actors associated with the first organization and unobservable by cyber actors associated with a second organization. In some embodiments, the cybersecurity system includes a cyber behavioral exchange engine, the cyber behavioral exchange engine in communication with the cyber behavioral space management module. In some embodiments, the cyber behavioral exchange engine is configured to transmit the cyber behaviors that increase or decrease risk to a cyber behavioral exchange engine associated with the second organization using at least one of a privacy preserving distributed machine learning algorithm and a privacy preserving communications protocol such that the cyber behaviors that increase or decrease risk can be used to analyze data in the second organization, and the cyber behavioral space data associated with the first organization is unobservable by cyber actors associated with the second organization.

In some embodiments, the first cyber actor data associated with the cybersecurity system that is configured to receive sensor data is processed to determine at least one of a first cyber behavior of the cyber behaviors associated with the transformed cyber behavioral space, and a first cyber scene of the plurality of cyber scenes associated with the transformed cyber behavioral space; and improve operational capabilities, readiness, and training associated with responding to the first cyber behavior and the first cyber scene.

In some embodiments, the analytic workflow engine is configured to process at least one of data from operational technology (OT) sensors, operational technology logs, packet data, network traffic, computer logs, signals intelligence, visible, infrared, multi-spectral, hyperspectral, synthetic aperture radar, moving target indicator radar, technical intelligence data, and intelligence reports.

In some embodiments, each of the plurality of cyber behavioral spaces associated with the cybersecurity system that is configured to receive sensor data include at least one of a real-time cyber behavioral space, a historical cyber behavioral space, and a simulated cyber behavioral space. In some embodiments, the cyber behavior includes at least one of initial reconnaissance, scanning, initial compromise, establishing a foothold, beaconing, command and control, credential capture, escalating privileges, internal reconnaissance, lateral motion, network mapping, data exfiltration, maintaining persistence, and related behaviors.

In some embodiments, the plurality of dimensions associated with the cybersecurity system that is configured to receive sensor data include a combination of source and destination addresses, time of arrival, volume, packet size, and a protocol type, the plurality of modes include a combination of packet data, network traffic, computer logs, signals intelligence, visible, infrared, multi-spectral, hyperspectral, synthetic aperture radar, moving target indicator radar, technical intelligence data, and intelligence reports, and the plurality of scales include a combination of temporal multi-scale data and geo-spatial data.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed descriptions of the disclosed subject matter when considered in connection with the following drawings, in which like reference numerals identify like elements. It is to be understood that the phraseology and terminology employed herein are for the purpose of description and should not be regarded as limiting.

DETAILED DESCRIPTION

Figure 1:
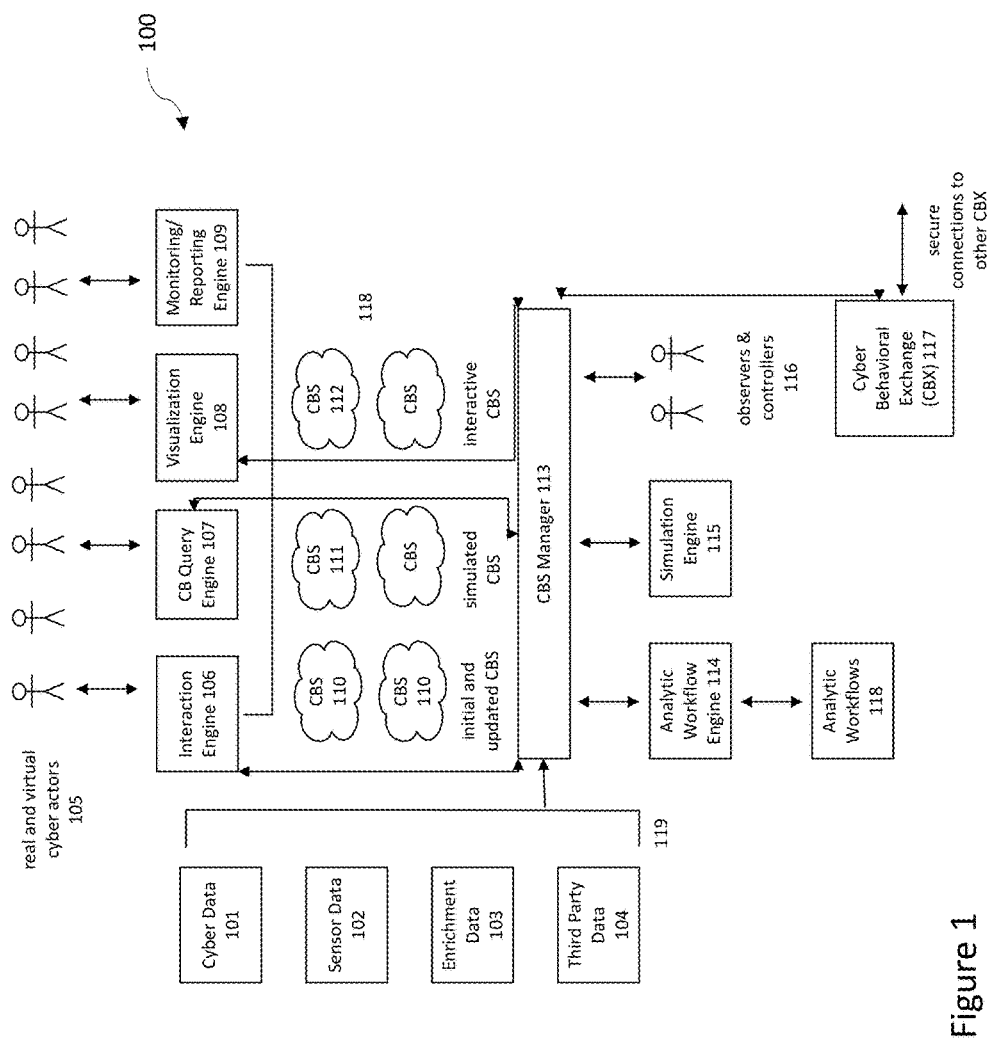
FIG. 1 is a system diagram showing a cybersecurity system, according to some embodiments of the present disclosure.

In some embodiments, simulations and a virtual reality system are used to enhance the operational capabilities and training of cyber defenders, by sharing behavioral related information with each other, including observed behavioral related information, behavioral related information computed by using analytic workflows, and behavioral related information generated when multiple real or virtual cyber actors, from one or more organizations, engage in scenes, simulations and virtual reality environments.

In some embodiments, behavioral related information is exchanged in a secure and privacy preserving manner using cyber behavioral exchanges so that two or more organizations can exchange information as part of scenes, simulations and virtual reality environments to enhance training, to improve the defense of an organization, or to improve the defense of multiple organizations sharing information.

Cyber Behavioral Spaces

Some embodiments of the cybersecurity system are based upon a cyber behavioral space (also referred to herein as CBS), which, in one of its implementations, includes at least one of the following five elements: 1) multi-dimensional, multi-modal, multiscale data; 2) cyber actors; 3) scenes; 4) assignment of cyber behaviors to 1), 2), or 3); and 5) assignment of physical behaviors to 1), 2), or 3). Each of these five elements is described in more detail below.

Multi-dimensional, multi-modal, multiscale data can include but are not limited to, data about: entities, actors, networks, physical spaces, virtual spaces, their behaviors, and their interactions. Multi-dimensional can refer to the data attributes that are derived, extracted, or calculated. Examples of data attributes for cyber data include, but are not limited to: source and destination addresses, time of arrival, volume, packet size, and protocol type. Multi-modal data refers to data derived from multiple sensor types or domains, including cyber domains. Examples of multi-modal data include but are not limited to: packet data, network traffic, computer logs, signals intelligence, visible, infrared, multi-spectral, hyperspectral, synthetic aperture radar, moving target indicator radar, technical intelligence data, and intelligence reports. Multiscale refers to data that can be used in models at different resolutions. Temporal data, geospatial data, organizational data, and network data can all be part of multiscale models. For example, temporal multiscale data refers to time that can be modeled, for example, in units of years, months, weeks, days, hours, minutes, seconds, milliseconds. Geo-spatial multiscale data, for example, can include data at different scales, such as house level, block level, multi-block level, city, and region.

A cyber actor can refer to individual actors or a collection of cyber actors. A cyber actor can also be an actual individual or a virtual actor, and can interact with real-time, historical and simulated cyber behavioral spaces. As described in more detail below, cyber behavioral spaces can include one or more cyber actors. In some embodiments, cyber behavioral spaces do not include any other cyber actors or simulated cyber actors.

A cyber scene can refer to a combination of actors, entities, networks, and physical or virtual spaces. In some embodiments, a scene does not contain any actors, or may not contain any entities, networks, or physical or virtual spaces. An example of a scene is: a cyber actor exfiltrating (or extracting) data from a compromised entity, the data exfiltration being identified by a behavioral model, and a cyber defender isolating the compromised entity from the network.

An assignment of cyber behaviors can be to 1), 2) or 3), as described above, or to structures, components or combinations thereof. Each of 1) multi-dimensional, multi-modal, multiscale data; 2) cyber actors; and 3) scenes can be themselves complex and usually have a hierarchical structure with elements, sub-elements; and collections or collections of collections etc. The assignments of cyber behaviors can be to elements, relationships among elements, arrangements among elements, or structures built from elements, sub-elements and their relationships, similarly for sub-elements, etc. or to collections, relationships among collections, arrangement among collections, or structures built from collections, collections of collections and their relationships, similarly for collections of collections, etc. Cyber behaviors, include, but are not limited to, initial reconnaissance, scanning, initial compromise, establishing a foothold, beaconing, command and control, credential capture, escalating privileges, internal reconnaissance, lateral motion, network mapping, data exfiltration, maintaining persistence, and related behaviors. For example, some clusters of points defined by features built from the data can be assigned "exfil behavior", while other clusters can be assigned "recon behavior." Exfil (data exfiltration) refers generally to the unauthorized copying, transfer or retrieval of data from a computer or storage device. Recon behavior refers generally to learning about a network and the devices it contains to facilitate its compromise. In some embodiments, behaviors can be assigned in the following manner: assume that each point in a first dataset is labeled with one of the cyber behaviors listed above or with a label, such as NA, indicating that the behavior associated with that point is not related to any of the enumerated behaviors listed above. Also assume that an algorithm is used to group the points into clusters. Each cluster can then be labeled with a label that is more relevant to that cluster than any of the other labels occurring in that cluster. Now, given a second dataset, each of the points can be assigned to the cluster that is most closely related to the data point and can then be labeled with the label corresponding to that cluster. Behaviors can be assigned to the points in the first dataset in multiple ways, including, but not limited to, using machine learning methods or statistical methods that analyze historical data, streaming data, or interactive data; using rules and rule engines to define behavior; using experts to define behavior; or using some combination of these methods.

An assignment of physical behaviors can be to 1), 2) or 3), as described above, or to structures, components or combinations of them. As with cyber behavior, the assignment of physical behavior can be to elements, sub-elements, etc. of 1), 2) and 3) and their arrangements and relationships and structures built from them, or collections, collections of collections, etc. of 1), 2) and 3) and their arrangements and relationships and structures built from them. Physical behaviors, include, but are not limited to: logins, geospatial locations of individuals both internal and external to an enterprise or work site, movements of humans, physical devices and machines, and interactions between humans, physical devices and machines. Examples include: workplaces, access paths, vehicles, data centers, environments containing physical devices and machines, physical plants and its components, such as transmission lines, and generation plants.

In some embodiments, only a subset of the five elements described above are present in a cyber behavioral space.

FIG. 1 shows a cybersecurity system 100, according to some embodiments of the present disclosure. Cybersecurity system 100 includes interaction engine 106, cyber behavior query engine 107, visualization engine 108, monitoring/reporting engine 109, CBS manager 113, analytic workflow engine 114, simulation engine 115, cyber behavioral exchange (CBX) 117 and analytic workflows 118. FIG. 1 also shows cyber data 101, sensor data 102, enrichment data 103, third party data 104, real and virtual cyber actors 105, an initial and updated cyber behavioral space (CBS) 110, simulated CBS 111, interactive CBS 112, and observers and controllers 116.

Cyber data 101 can include multi-dimensional, multi-domain, multiscale cyber data, including, but not limited to, data about cyber entities, cyber actors, network packets and flows, their behaviors, and their interactions. In some embodiments, cyber data 101 is managed by a data management system (not shown). A data management system can be a relational database, an interface to a configuration management system, or any other computer system that has an integrated user interface and storage mechanism.

Sensor data 102 can include actual or simulated data for the physical environment, including but not limited to: visible, infra-red, multi-spectral, hyper-spectral, synthetic aperture radar (SAR), moving target indicator (MTI), security cameras, acoustic, biometric, and card readers. Different types of sensor data 102 is also referred to herein as multi-modal data.

Enrichment data 103 includes information that provides additional context to cyber data and sensor data including but not limited to: dynamic host configuration protocol (DHCP), domain name system (DNS), asset management, configuration management, log files, and human resource information.

Third party data 104 are additional sources of data that can be correlated with the previous data types, including but not limited to: threat management feeds, reputation domains, and blacklists.

A collection of analytic workflows 118 that process historical data, streaming data, simulated data and data from interactions to identify cyber behaviors. Cyber behaviors, include, but are not limited to: initial reconnaissance, scanning, initial compromise, establishing a foothold, beaconing, command and control, credential capture, escalating privileges, internal reconnaissance, lateral motion, network mapping, data exfiltration, maintaining persistence, and related behaviors. In some embodiments, the cyber behavior is defined by machine learning methods or statistical methods that analyze historical data. In some embodiments, rules are used, either manually coded by experts or managed by a rules engine, to define behavior. In some embodiments, a combination of these and other methods are used.

Cyber actors 105, can be actual individuals or virtual ones, with the ability to interact with real-time, historical and simulated cyber behavioral spaces containing scenes involving zero or more other cyber actors and zero or more simulated cyber actors.

An interaction engine 106 enables both real and virtual cyber actors 105 to interface and modify the cyber behavioral system.

A cyber behavior query engine 107 enables real actors, virtual actors, and other components of the system to query CBS for cyber behaviors, such as, but not limited to exfill, beaconing, or exploitation behaviors, either in general, or those cyber behaviors that are restricted to other constraints, such as, but not limited to restrictions to certain times of day, certain network segments, and certain ports. In some embodiments, the cyber behavioral query engine can also retrieve certain subsets of data from the CBS, such as all data associated with specified time segments, specified network segments, specified ports, specified users, specified devices, or Boolean combinations of these and any other attributes or features of the data in the CBS. In some embodiments, the cyber behavioral query engine can also drill down along dimensions, such as but not limited to time, network segments, and categories of users. For example, a drill down of users can proceed from all users, to all employees, to all employees with a division, and to all employees within a department in the division.

A visualization engine 108 provides 2-D and 3-D representations of the CBS, its processes, components, and outputs.

Monitoring/reporting engine 109 provides real-time and historic status of the CBS and its processes and components.

Initial CBS 110 provides a starting state for the simulated CBS. Updated CBS 110 is the resulting CBS after data and other updates of the system.

Simulated CBS 111 represents the CBS generated by the simulation engine 115, as well as other updates provided by the CBS manager 113.

Interactive CBS 112 represents the CBS generated by the interaction engine 106, as well as other updates provided by the CBS manager.

A general CBS 118 is referred to herein as any one or combination of an initial CBS 110, an updated CBS 110, a simulated CBS 111, an interactive CBS 112, or any other CBS generated by one of the system components.

CBS manager 113 (which is also referred to herein as a cyber behavioral space management module) manages data 119, including, but not limited to cyber data 101, sensor data 102, enrichment data 103 and third party data 104. The CBS manager 113 also provides control and update mechanisms for the CBS associated with the system, including managing the initial simulated CBS, the CBS associated with simulated environment, the CBS associated with interactive environments, the CBS associated with the real environment, other CBS, and various combinations of these. The CBS manager 113 is in communication with each of the other components within the cybersecurity system 100. The CBS manager processes data and routes processed and unprocessed data between the components. As described herein, CBS manager 113 generates cyber behavioral spaces based on the input data. In some embodiments, the cyber behavioral spaces are generated or updated by analytic workflows 118 run by analytic workflow engine 114 applied to at least one of CBS, input data, and data from other system components, as described in more detail below.

The analytics workflow engine 114 manages the types and combinations of analytics that operate on the CBS, including the analytic workflows for the tensors associated with the CBS, and the analytic workflows for the lower rank approximations of the tensors associated with the CBS. In some embodiments, the analytic workflow engine 114 analyzes cyber behavioral space data associated with cyber behavioral spaces to compute cyber behaviors, and updates at least one of the cyber data, the cyber actor data, and the cyber scene data based on at least one of the cyber behavioral space data, computed cyber behaviors and an assignment of the computed cyber behaviors to at least one of the cyber data, the cyber actor data, and the cyber scene data, and interactions between cyber actors with other cyber actors and with the cyber behavioral space. For example, if an actor who normally does not connect with any databases, logs into workstation that he has never logged into before and tries to connect to several databases and fails, a first analytic workflow that examines normal behavior for that actor can assign a high score based upon his use of a new machine and for contacting services that he does not normally contact, such as databases. A second analytic workflow can assign a high score based upon the number of unsuccessful logins, while a third analytic workflow can assign a high score based upon a particularly sensitive database that he attempted to connect to even if the login did not fail. Finally, a fourth analytic workflow, based upon an analysis of the scores from the three analytic workflows, can assign a label of a "probable bad actor" to the actor and might assign a label of "attempted unauthorized access" to the points in the dataset associated with the failed logins to the databases, and might assign a label of "attempted lateral motion" to the scene consisting in part of the probably bad actor, his associated workstations, the various databases, and the associated connections.

The simulation engine 115 provides the mechanisms for initializing and updating the simulated CBS, based upon simulations, based upon algorithms as well as inputs from the real world, and from virtual and real cyber actors.

Observers and controllers 116 manage the overall state of the CBS in order to ensure the objectives are achieved.

The cyber behavioral exchange 117 provides the mechanism for securely sharing data and mediating interactions with other CBS's internal to or external to an enterprise.

In some embodiments, the data for the cyber behavioral space 110, 111, 112, 118 comes from the data 119, which includes the cyber data 101, the sensor data 102, the enrichment data 103, and the third party data 104. The cyber behavior for the CBS is defined by the analytic workflows 118 managed by the analytic workflow engine 114. The real and virtual cyber actors 105 provide the cyber actors required by the CBS, and the scenes required by the CBS are generated by the simulation engine 115, the interaction engine 106, the analytic workflow engine 114, or a combination of the engines 106 114 115.

In some embodiments, the cyber data 101, the sensor data 102, the enrichment data 102 or third party 103 can be distributed, either within a single location, or across two or more geographically distributed locations. In the case the data is distributed, networks, including high performance networks, enterprise service busses, or other technology is used in some embodiments to transport the data. Similarly system components, including, but not limited to, the analytic workflow engine 114, the simulation engine 115, the interaction engine 106, and the visualization engine 108 can be distributed.

CBS can be enriched with maps. Maps in this context can be viewed as a visualization that is tied to an information space, a physical space, a network space, a cyber space, a social space, and an organizational space, or some combination of these different types of space containing data and information. An organizational space shows the relationships among a set of entities. An example is an organizational structure for a business or other organization. Internal organization spaces can refer to "internal" on inside the organization itself, while "external" can refer to relationships with other entities. For example, a CBS can be enriched with maps about: the physical locations of the facilities associated with an organization; about the network topology that describes how the different network entities and other devices are connected together; about the organizational space, describing individuals and their reporting structure; and about the information structure describing how data is organized.

In some embodiments, a scene refers to a sequence of behaviors by real or virtual cyber actors 105 that can be dependent on: i) cyber, sensor, enrichment, third party, or other data; ii) interactions of two or more of the real or virtual cyber actors in the scenes; or iii) one or more actions by third parties (i.e. actions by real or virtual actors that are not in the scenes); or, iv) one or more interactions by third parties with the real or virtual actors in the scene. Scenes can be combined to create training scenarios. In some embodiments, actors from the same organization can be geographically distributed and communicate via a network. In other cases, both real and virtual actors from different organizations, which can be geographically distributed, can use the cyber behavioral exchange 117 to communicate.

Scenes can bring in multiple defenders from different geographic locations using the cyber behavioral exchange 117 to participate in the simulation in order to understand a common problem in a synchronized manner. Interactive scenes and scenarios can, in some embodiments, involve changes made by actions that active defenders are taking and that the adversaries are taking. As an example, in a scene a cyber actor can engage in network reconnaissance from a compromised machine that is quiet enough to hide in the background noise of a network segment, while multiple defenders from multiple geographic locations acting individually or in teams try to locate the cyber actor and the compromised machine from observed behaviors in the network segment.

CBS can be created in multiple ways, including, but not limited to, updating an existing CBS to create an updated CBS 110 based upon new data, simulating behaviors to create simulated CBS 111, and having real or virtual actors engage in interactive environments to create CBS with interactive behavior 112. Behaviors can be defined in multiple ways, including the following: i) Machine learning and artificial intelligence (AI) methods can be used to learn behavior from historical or simulated data; ii) The CBS system, in some embodiments, has an application programming interface (API) so that behaviors can be generated using rules, code involving behavioral primitives, or using more complex environments for generating user specified behaviors; iii) Behaviors can be learned by using natural language processing to extract behaviors from text in documents, from text stored on internal networks, from text extracted from the internet, and from text extracted from social media systems; and iv) Behavior can be extracted by processing data produced when actual individuals engage in specified or ad hoc behaviors.

Multiscale Data and Tensor Representations

As the volume of data, as the number of dimensions, as the number of model segments, and as the number of modalities of the data grows, some embodiments of the present disclosure represent data 119 as tensors. A tensor is a multi-index array of numbers. The order of a tensor is the number of its modes or dimensions. Tensors can be thought of as generalizations of vectors (tensors of order one) and matrices (tensors of order two), and include both vectors and matrices as special cases. The elements of tensors are numbers that can be derived, extracted, or calculated, and can represent multimodal data. An example of a tensor of order three, is a numerical array with five indices, where the elements represent the volume of traffic from source IP to destination IP associated with a particular protocol during a day. Assume in this example, that observed protocols are grouped into 25 types, numbered 1, 2, ..., 25. Here the three dimensions are: source IP, destination IP, and protocol type. Examples of multi-modal data attributes that can be used to create tensors, include, but are not limited to: packet data, network traffic, computer logs, signals intelligence, visible, infrared, multi-spectral, hyperspectral, synthetic aperture radar, and moving target indicator radar.

In some embodiments of the present disclosure, tensors are processed using workflows that are described by acyclic graphs, in which nodes represent computations, and directed edges represent data flows from one node (the source of the edge) to another node (the target of the edge). Nodes can have multiple tensor inputs and outputs, and some inputs and outputs can use slices or projections of the tensor inputs and outputs. Workflows that are described by acyclic graphs are examples of the analytic workflows managed by the analytic workflow engine 114. In particular, analytic workflows like these can be used to process the data in the CBS to extract behaviors of interest using machine learning, using statistical techniques, using rules, or using any of the other methods described in this disclosure. Tensor-based methods are also used to create the simulated CBS 111 by the simulation engine 115.

For any of the variables in the data, analysis can be done at different scales or levels of granularity, using a number of different methods. Multiscale modeling refers to a type of modeling in which multiple models at different scales are used simultaneously to describe a system, with the different models using data on different scales of resolution. For example, with multiscale temporal analysis, a jumping window 205, as described in more detail with respect to FIG. 2, can be used to replace all the measurements in the window with a single measurement, for example, a mean, trimmed mean, median, or some other statistic or feature computing from the data in the window. As described herein, a window refers to a contiguous subset of a data attribute or feature x, such as data in the interval [x, x+w]. Windows can jump by moving in a non-overlapping fashion, for example from [x, x+w], [x+w, x+2w], or they can slide by an amount s, where s<w, for example from [x, x+w], [x+s, x+s+w], [x+2s, x+2s+w]. By using different size windows, such as windows that grow in size multiplicatively, CBS at different scales of resolution are generated. Multiscale analysis is applicable both to the original and any features derived from the original data. Multiscale temporal analysis of the data and behaviors associated with CBS can also be used to slow down or play in faster than real time behavior associated with CBS.

Figure 2A:
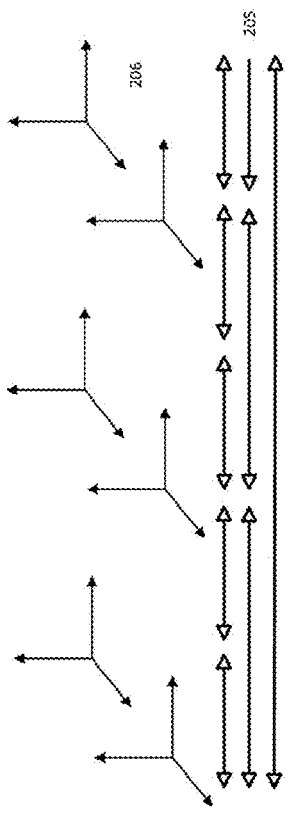
FIG. 2A is a diagram showing multiscale modeling techniques using windows of different sizes, according to some embodiments of the present disclosure.
Figure 2B:
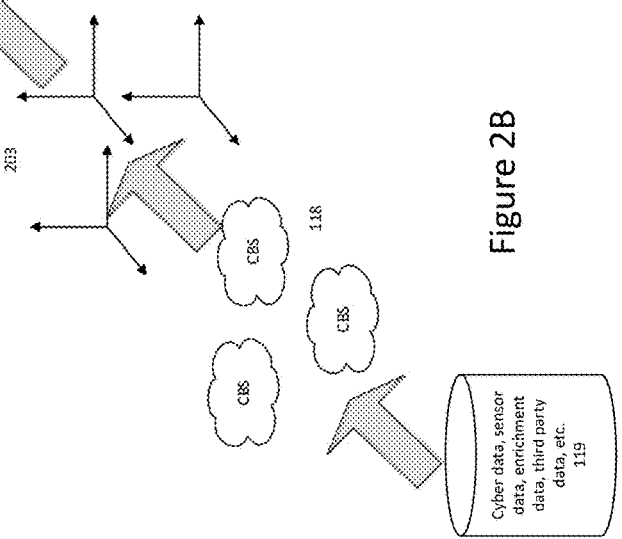
FIG. 2B is a diagram showing multiscale modeling used for modeling data in the CBS and for tensor representations of the CBS, according to some embodiments of the present disclosure.

FIG. 2 is a diagram showing the computation of multiscale representations of the data 119, according to some embodiments of the present disclosure. FIG. 2a shows multiscale modeling techniques using windows of different sizes, according to some embodiments, and FIG. 2b shows how multiscale modeling can be used for modeling data in the CBS 118 and for tensor representations 203 of CBS, according to some embodiments. In this way, data 119 can be used to compute CBS 118 that involve multiscale modeling, which in turn can be represented using tensors 203 that involve multiscale modeling. The CBS data and tensors can be analyzed by analytic workflow engine 114 to create behavioral models, and the behavioral models and associated data can be made available for queries.

As shown in FIG. 2, a sequence of jumping windows 205 of increasing size, with each window twice the size of its predecessor can be used to create a multiscale representation of the data. Windows of increasing size or scale can be generated in other ways, such as making each window 10×, 100× or 100× larger than the previous one for example. Tensor representations of the data 206 and tensors representations of the multiscale representations of the data 203 can be analyzed by the system in the ways described below. Some advantages using tensor representations as described herein include enabling 1) multi-scale temporal virtual reality (VR) and playback of historical data, including playback that is faster than real time; 2) multi-scale temporal VR playback of simulated data, including the capability for playback faster than real time; 3) multi-scale temporal VR of integrated historical and simulated data.

As a simple example of a tensor and of multiscale analysis, a 5-way tensor with dimensions source IP, destination IP, source port, destination port, and time t can be constructed for time scales w of 1 ms, 10 ms, 100 ms, 1 sec, 10 sec, 100 sec, 1000 sec, 10,000 sec and 100,000 sec, where each element of the tensor indicates the number of packets from the source IP and source port to the destination IP and destination port during the time period t to t+w. If visualizations and interactions are refreshed once per 100 ms (i.e. at 10× per second), then using tensors associated with windows at 1 sec or longer produces visualizations that are faster than real time (in other words, time is speeded up). For example, if windows are 10 seconds in size and scenes in interactive CBS environments or interactions between real and/or virtual actors are refreshed 10× per second, then each second of interaction between real or virtual actors as measured by the wall clock corresponds to 100 second of activity if the activity were to play out at real time. That is, the virtual interactions in the interactive CBS environments are faster than real time.

Some embodiments of the system use methods to reduce the data in the CBS and its tensor representations to a lower dimensional structure, such as lower rank approximations to the tensors representing the data or the processed data in the CBS. One way of defining tensor rank is to decompose a tensor of order k as a sum of outer products of k vectors of the appropriate dimensions, as in the example below. In this case, the number of summands is the rank. These lower rank approximations to the original tensors can be computed in different ways, including, but not limited to, the CANDECOMP/PARAFAC (CP) or the Tucker decomposition of a tensor. In some embodiments of the system, behavioral models are associated with features from these lower rank approximations to the original tensors.

As a simple example, consider an order 3 tensor $T_{x1, x2, x3}$, where the first tensor component is of dimension $n_1$, the second tensor component is of dimension $n_2$, and the third tensor component is of dimension $n_3$. The tensor $T_{x1, x2, x3}$ can be written as a sum:

$$T_{x1, x2, x3} = \Sigma a_i \circ b_i \circ c_i,$$

where the sum is for i=1 to r, $a_i$, $b_i$ and $c_i$ are vectors of dimensions $n_1$, $n_2$ and $n_3$ respectively, and the $\circ$ indicates the outer products of the vectors. Here r is the rank of the lower dimensional tensor approximation. Observe that the tensor $T_{x1, x2, x3}$ has $n_1$ $n_2$ $n_3$ degrees of freedom, while the lower dimensional rank r tensor approximation has r $(n_1+n_2+n_3)$ degrees of freedom, which is much smaller than $n_1$ $n_2$ $n_3$ for small r and large dimensions $n_1$. This is because, for example, there are $n_1$ degrees of freedom for $a_1$, $n_2$ degrees of freedom for $b_1$, and $n_3$ degrees of freedom for $c_1$, hence $(n_1+n_2+n_3)$ degrees of freedom for the outer product of the $a_1 \circ b_1 \circ c_1$. Since there are r such outer products in the sum on the right hand side of the equation above, the observation follows. This decomposition can be computed using several algorithms, including the CANDECOMP/PARAFAC algorithm.

In some embodiments, machine learning methods are applied to the data from the sensors by analytic workflow engine 114 to create processed behavioral data 210, which includes behavioral models, cluster and segment behavior, and entity risk matrices. The created data can then by be queried by a user-specified parameter such as behavior, risk, or ad hoc queries. In some embodiments, rules and machine learning methods are applied to the entity risk matrices themselves so that the risk of entities is based upon rules and analytics that includes the outputs of the various rules, models, and workflows that are put of the system. These updated entity risk matrices, which can be updated using batched, streaming, event-based updates, can then by be queried by a user-specified parameter such as behavior, risk, or ad hoc queries.

Figure 3:
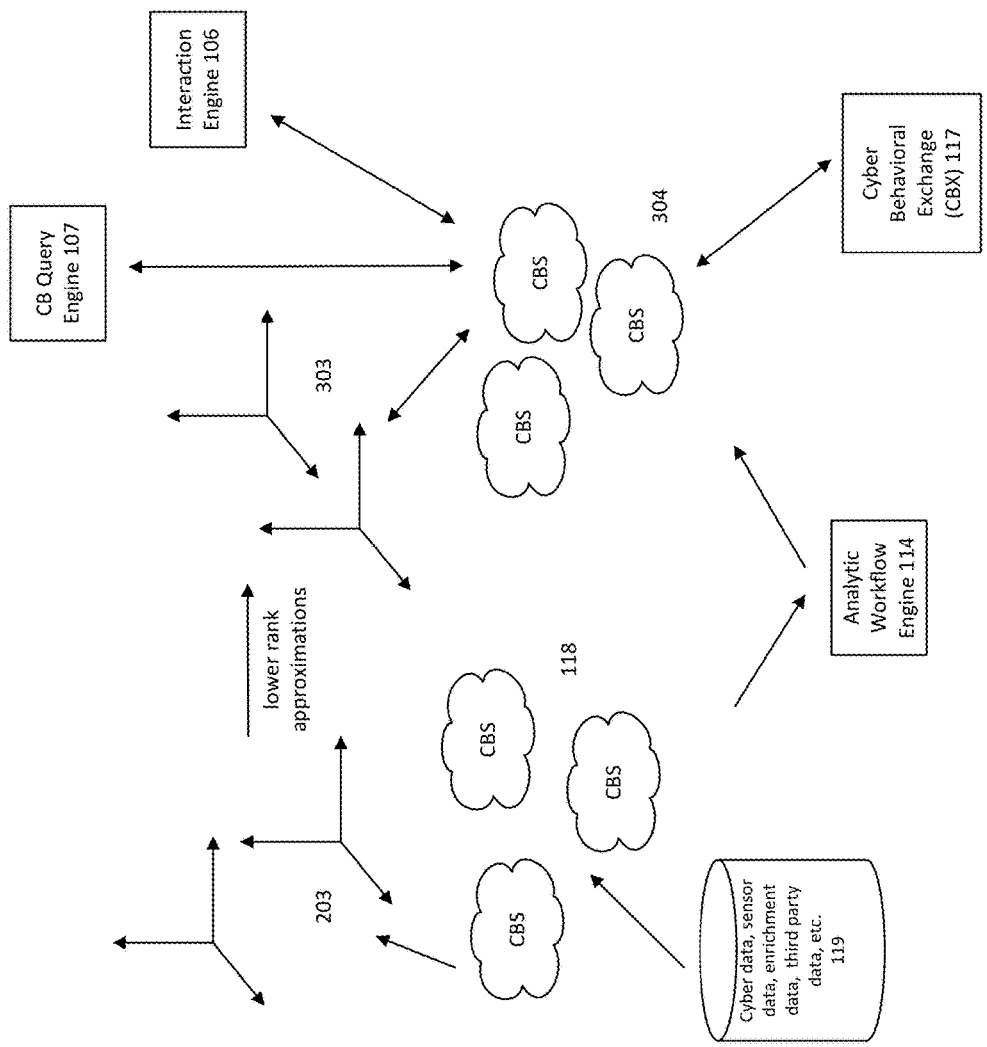
FIG. 3 is a diagram showing the role of lower rank approximations and tensors in the creation of a cyber behavioral space (CBS), according to some embodiments of the present disclosure.

FIG. 3 is a diagram showing lower rank approximations to tensors in the creation of CBS, according to some embodiments of the present disclosure. In some embodiments of the present disclosure, lower rank approximations are computed from the tensors 203 associated with the CBS 118 by using the analytic workflow engine 114 to apply analytic workflow to compute lower rank tensors approximations 303 to the tensors 203. These lower rank tensors approximations 303 are in turn used to define new transformed CBS 304. In this way, data 119 is used to create CBS 304 with statistical properties that can be more useful for certain applications since some higher dimensional "noise" can be removed using these lower rank tensor approximations 303. The cyber behavioral query engine 117 can query the CBS 304, and the interaction engine 106 can support interactive environments based upon the CBS 304. Also, the cyber behavioral exchange 117 can share information from the CBS 304 with CBS associated with other organizations.

In some embodiments, the analytic workflow engine 114 computes multiple analytic models using tensor based methods about each entity and/or actor and uses these multiple analytic models to create risk scores for each entity and/or actor. In some embodiments, these risk scores are updated as new data is processed that is relevant to the entity or actor. An actor can refer to an individual or collection of individuals or organization or collection of organizations. For example, actors can include individuals or groups of individuals, either known or unknown, attacking or defending a system. Entities can refer to any element that is associated with data, including network devices, workstations, servers, mobiles devices, and sensors. In general entities can also include individuals, groups and organizations that are associated with data. Depending upon the context, physical entities associated with data can be distinguished from individual and organizations associated with data (actors).

Interactive CBS Environments

Figure 4:
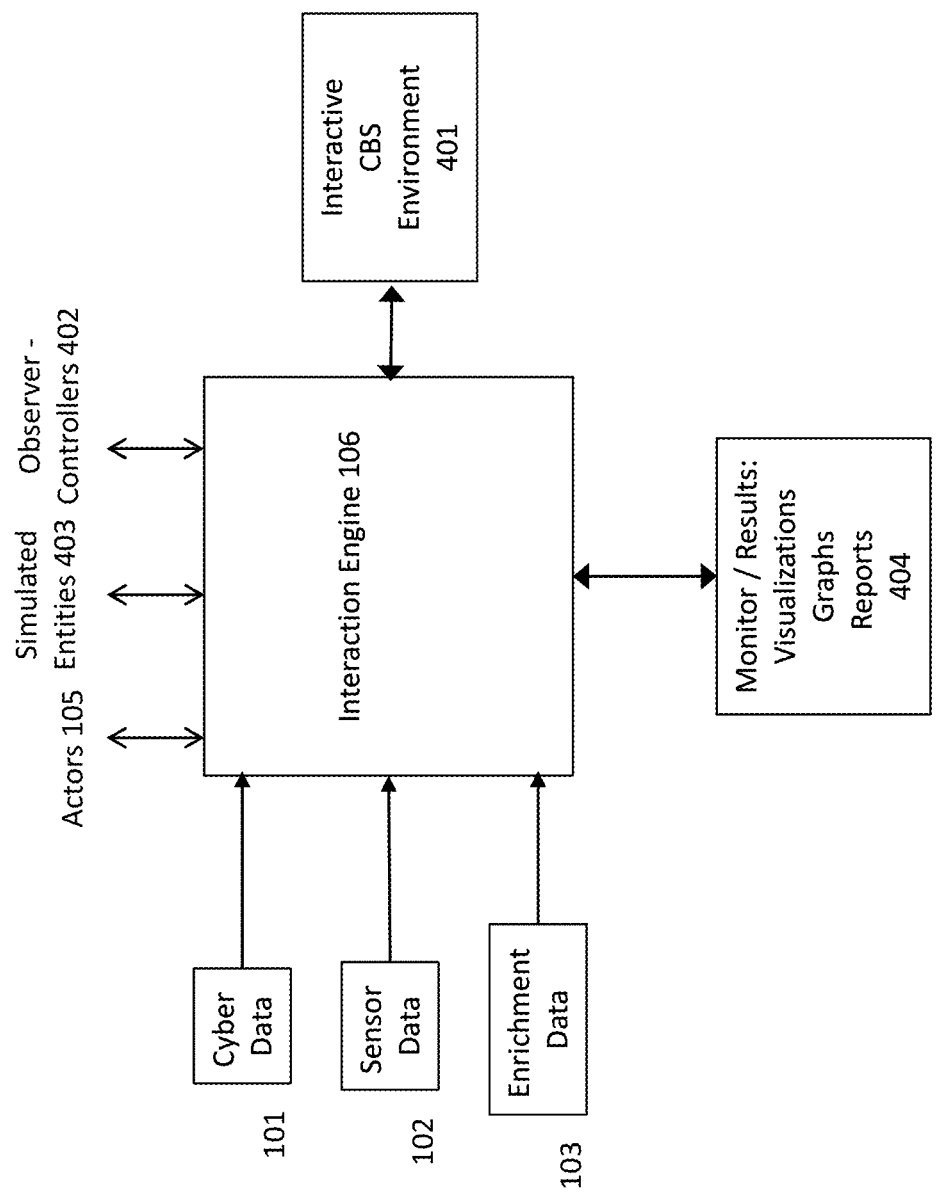
FIG. 4 is a system diagram showing an interaction engine managing an interactive CBS environment, according to some embodiments of the present disclosure.

FIG. 4 is a system diagram showing an interaction engine 106 managing an interactive CBS environment 401, according to some embodiments of the present disclosure. The interaction engine 106 creates interactive CBS, enabling two or more actual or virtual cyber actors 105 to asynchronously update one or more of the CBS managed by the interactive CBS environment 401 with specific actions or interactions, or with sequences of actions or interactions defined by supported cyber behaviors. Multiple real or virtual cyber actors engage in cyber interactions in virtual environments by using the interaction engine 106 to update the interactive CBS environments 401, and in this way, create virtual reality environments.

The interaction engine 106 uses stores of historical cyber data 101 to provide a foundation for the creation of the interactive CBS environment 401. Sensor data 102 provides information about physical environment. Enrichment data 103 provides additional context. The interaction engine 106 creates an environment consisting of a set of CBS that integrates these information sources.

The interactive CBS environment 401 provides a distributed system for visualization, analysis, collaborate, planning, training, exercises, and wargames. Numerous actors 105 can compete or collaborate in the interactive CBS environment 401. Actors 105 can be organized into teams or other groups. Actors 105 can represent their own or other organizations. Actors 105 can have a wide range of goals that can compete with other actors 105.

Simulated entities 403 can represent a synthetic version of an actor 105, but can also represent a wide range of other entities within the interactive CBS environment 401. Some simulated entities 403 can represent adversaries. Other simulated entities 403 can supplement and support actors 105 by simulating actors 105 to provide additional functions. Simulated entities 403 can be used to increase the scale of the activities within the interactive CBS environment 401. Simulated entities 403 can represent equipment in the interactive CBS environment 401 that operates autonomously or responds to the actors 105 or other simulated entities 403.

Observer—controllers 402 monitor the interactions among the actors 105, simulated entities 403, and the interactive CBS environment 401. Observer—controllers 402 can assist in the analysis of a set of interactions within the interactive CBS environment 401. Observer—controllers 402 can intervene in the interactions among the actors 105, simulated entities 403 within the interactive CBS environment 401 in order to ensure the goals of the analysis, training exercise or scenario are met.

The interaction engine 106 produces a set of results 404. In some embodiments, the interaction engine 106 can generate interim results as well as final results. The results can consist of visualizations, graphs, and reports on the activities of the actor 105 and simulated entities 403 as well as the overall results of the analysis, training exercise or scenario.

In some embodiments, the interaction engine 106 allows multiple defenders, represented as actors 105 or simulated entities 403 from different geographical locations to participate in the simulation to understand a common problem set in a synchronized manner. This capability is supported by the ability of the CBS 401 to integrate geographic maps into the CBS 401. Similarly, multiple defenders from different companies and different sectors can be brought into a virtual reality environment to understand a common problem set in a synchronized manner. This capability is supported by the ability of the CBS 401 to integrate organizational maps into the CBS 401.

Figure 5:
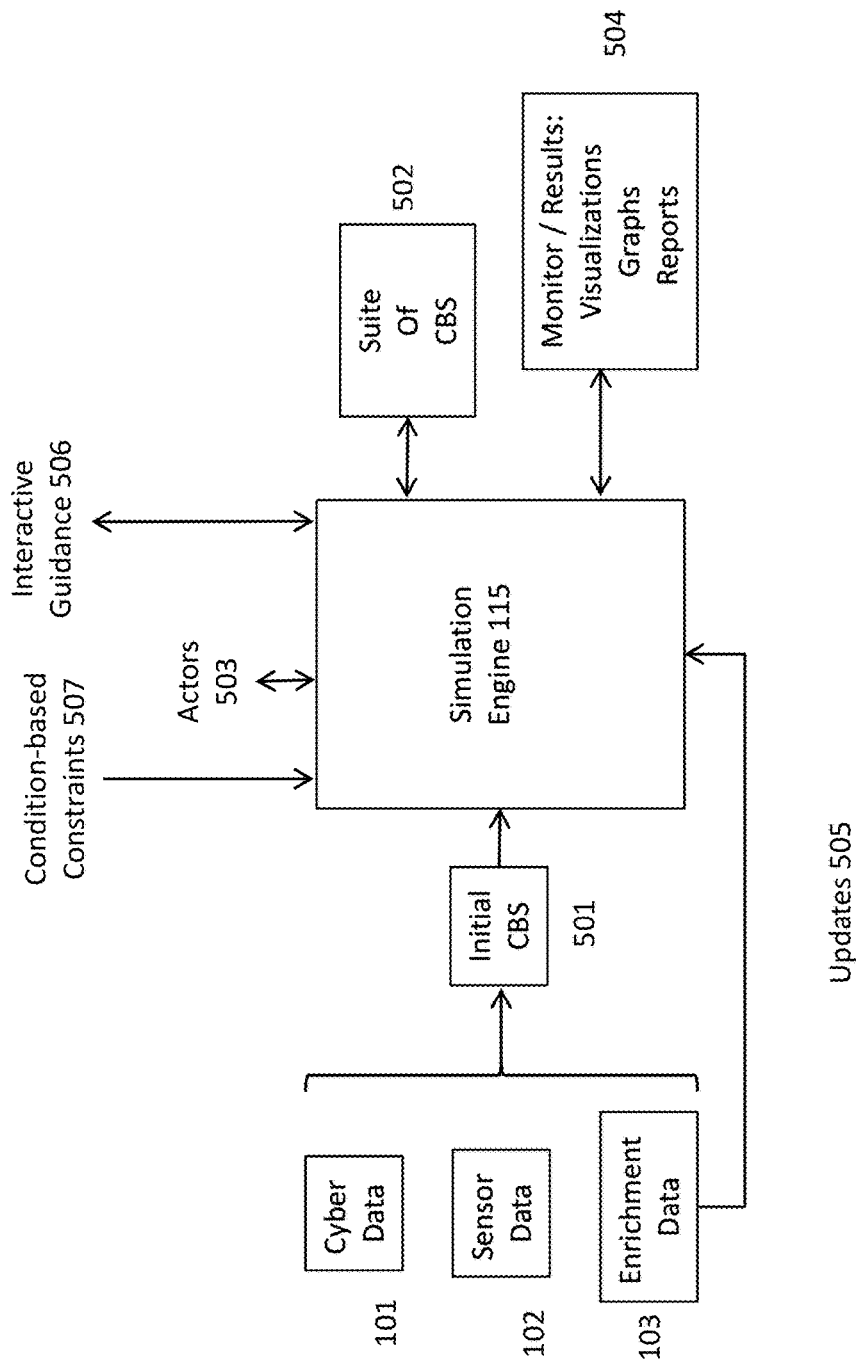
FIG. 5 is a system diagram showing a simulation engine managing a suite of CBS, according to some embodiments of the present disclosure.

FIG. 5 is a system diagram showing a simulation engine 115 managing a suite of CBS, according to some embodiments of the present disclosure. The simulation engine 115 creates simulated cyber behavior, using one or more of the methods described above. In particular, in some embodiments, cyber data 101, sensor data 102 and enrichment data 103 are used to create an initial CBS 501 and to provide the statistical information required by the simulation engine 115. This simulation capability allows the network defender to bring the network to life, and simulate various processes, events and actions to determine potential outcomes. The context of simulation allows network defenders to understand the impact of a number of different tools to determine what are the best options and actions to actively defend a network.

The suite of CBS 502 generated by the simulation engine 115 are compared and contrasted to each other in order to optimize network defense actions. In particular, behavioral models generated by the analytic workflow engine 114 can be used to create specified cyber behaviors of interest to particular actors 503 in particular scenes and scenarios, and to update the simulation. The simulation engine 115 can also be used to dynamically test network configurations to find weaknesses.

The simulation engine 115 can also be used to test and certify network defenders, and to train multiple companies within a sector using simulation programs and the monitoring and reports 504.

Finally, the simulation engine 115 can be used to explore dynamically in faster than real time the relative importance of ongoing events to prioritize actions for network defenders. In particular, smaller scale or "micro" simulations can be used to support simple network defense actions for various levels of trained defenders.

In some embodiments, the system uses a set of encryption keys to verify that the participants in the simulation are cleared to participate in the simulation. In this way, there is a verifiable and secure way to bring teams together, even distributed teams from within an industry sector or from multiple industry sectors, using the cyber behavioral exchange 117, for example as shown in FIG. 1.

Updates 505 provides a mechanism for changes in the cyber data, sensor data, and enrichment data that occur during the time period of the simulation but do not affect the simulation to be incorporated into the CBS. For example, changes in terrain data might not change the simulation, but should appear in the CBS. Changes in cyber data, sensor data, and enrichment data that do change the simulation are incorporated as part of the simulation system operation.

Interactive Guidance 506 provides a mechanism to alter the CBS outside the normal course of the simulation operation. This mechanism can be used for users/administrators to guide the course of the simulation to prune uninteresting or non-productive areas.

Condition-based constraints 507 provide a mechanism for minimizing inaccurate results by preventing the simulation from exceeding limits. Simulations usually have conditions beyond which they become inaccurate or invalid. For example, flight simulations can be invalid above certain airspeeds, altitudes or for unusual attitudes.

CyberBehavorial Exchanges

Figure 6:
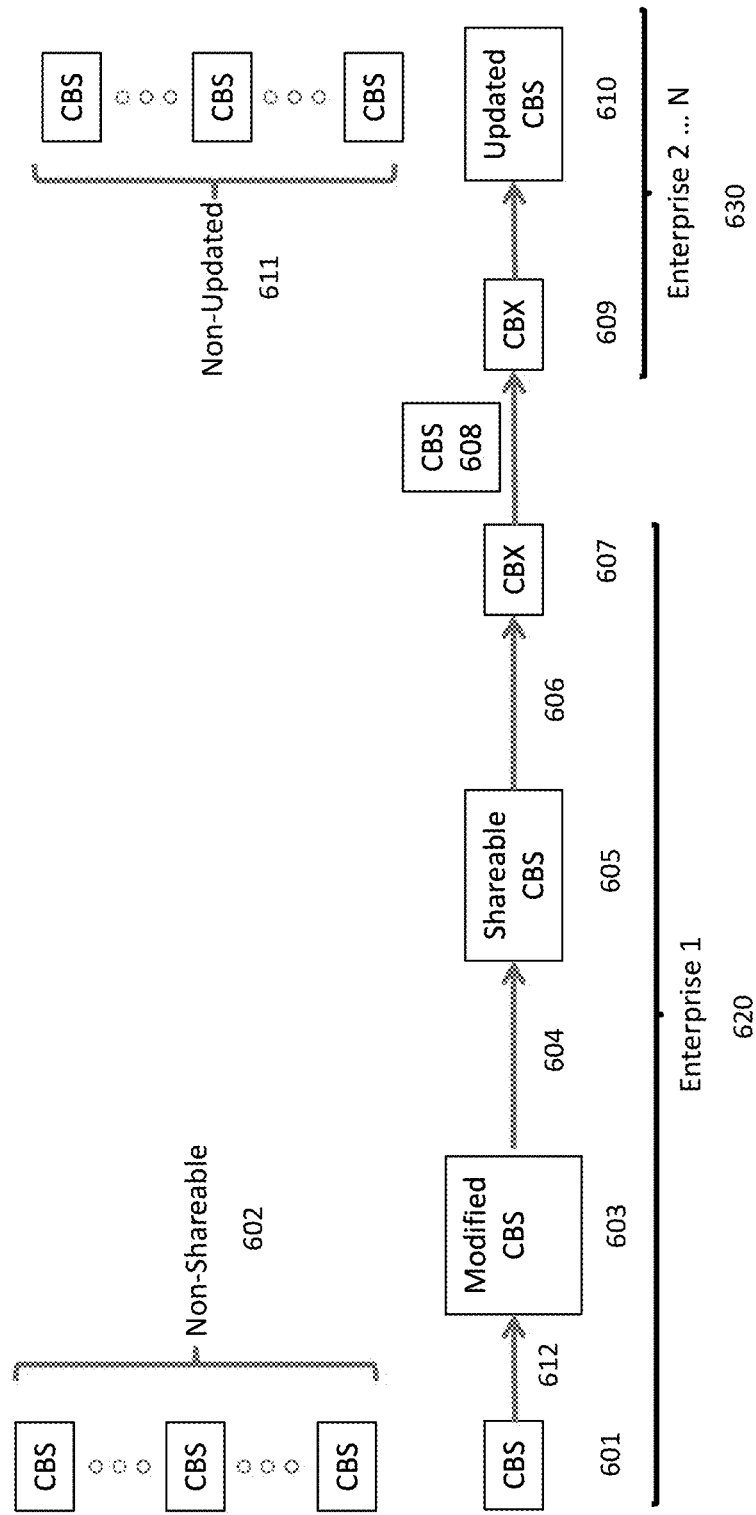
FIG. 6 is a system diagram showing the operation of multiple cyber behavioral exchanges (CBX) to share information securely within or between enterprises in a controlled fashion, according to some embodiments of the present disclosure.

Information from two or more systems can be shared via cyber behavioral exchanges. FIG. 6 is a system diagram showing the operation of multiple cyber behavioral exchanges (CBX) to share information securely within or between enterprises 620 630 in a controlled fashion, according to some embodiments of the present disclosure.

In some embodiments, CBS's containing shareable information 601 are identified. Some CBS 602 within an enterprise are not sharable, due to the information sharing policies of the participating organizations.

A modified CBS 603, created, for example, by projection, masking of data, transformation of data, using a fixed number of principal components, reduction to a lower rank approximation, using privacy preserving machine learning, or homomorphic encryption, or similar method, can be created that contains a subset, transformed set, or encrypted set of information to be shared in the correct format for machine or human consumption. In some embodiments, system component projects, masks, or otherwise transforms 612 the data to create a modified CBS 603.

In some embodiments, if any private or sensitive business information remains, then privacy preserving transformations, such as adding noise to the data, or encrypting the data using homomorphic encryption is used in 604 to transform the data into a sharable CBS 605.

Any additional constraints on information sharing 606 that are required by the information security and other policies of the participating organizations are applied.

In some embodiments, the resulting shareable CBS 605 is sent to the CBX 607 for secure transmission to other CBX-enabled enterprises 630, including, possibly, to trusted third parties. In some embodiments, if the CBX-enabled enterprise 630 is trusted by each of the enterprises that submit data to it, information does not have to be shared with other organizations directly, by only indirectly when the trusted third party returns the results after privacy preserving transformations and aggregations are applied to the submitted data.

In some embodiments, the shareable CBS 605 is encrypted to create a secure CBS 608 that is transmitted securely to other CBX-enabled enterprises for machine or human consumption.

The shareable CBS 605 or the encrypted CBS 608 is received by one or more CBX-enabled enterprises 630 via a CBX 609 associated with that enterprise.

The cooperating enterprises update the relevant CBS to create updated CBS 610. Determining which CBS are relevant for updates can be done in multiple ways, which include, but not limited to: using unique keys for entities, actors, behaviors, data to determine which should be updated; using tags, attributes, features, and behaviors to determine which should be updated; or, using rules or machine learning methods to select which CBS should be updated.

In some embodiments, some CBS 611 are not updated, based on the security and information sharing policies, rules, or regulations of the relevant enterprises.

In some embodiments, the CBS exchanged according to the process described in FIG. 6 can be as simple as a single formatted data record or a collection of formatted data records or as complex as a collection of cyber data, cyber actors and cyber scenes representing particular trade craft for gaining access to a protected environment, escalating privileges, moving laterally, and attacking the system.

Virtual Training and Defense

In some embodiments, simulations and a virtual reality system are used to enhance the operational capabilities or training of cyber defenders by sharing behavioral related information with each other, both observed behavioral related information, and behavioral related information generated when multiple real or virtual cyber actors engage in scenes, simulations and virtual reality environments. Sharing observed or simulated cyber behaviors in this way between all operational elements, within or among geographically dispersed enterprises, enables an immediate "army" of cyber defenders versus a single element of defenders. This "army" of both real and simulated virtual cyber actors or avatars, enables the cyber defenders to engage and collaborate in scenes, simulations and virtual reality environments. This real-time collaboration is enabled by simulating multiple courses of action (COAs), defensive strategies, impacts of actions and incorporating this information into a shared virtual environment for enhanced visualizations supporting a more comprehensive and rapid operational understanding and decision process.

In some embodiments, the exchange of behavioral related information can be from real and virtual actors or avatars from two or more organizations. In some embodiments, the simulations and virtual reality environments can also be from two or more organizations. In this way, cyber defenders from two or more organizations can engage and collaborate in scenes, simulations and virtual reality environments.

In some embodiments, the simulation engine 115 is used to generate multiple simulated CBS 111 that are used in the interactive CBS environment 401 to provide courses of action (COA) for network defenders (in the case that some of the actors 105 are network defenders). The data to create the interactive CBS environments can include, but is not limited to, cyber data 101, sensor data 102, and various types of enrichment data 103. Actors 105 and observers/controllers 402 can use the interaction engine 401 to create training scenarios, develop COA, replay scenarios and take different actions to try to improve outcomes. These scenarios in the interactive environment can include simulated entities 403.

In some embodiments of the present disclosure, the simulation engine 115 is used to generate multiple simulated CBS involving simulated virtual cyber actors engaging in behavior, such as, but not limited to, initial reconnaissance, scanning, initial compromise, establishing a foothold, beaconing, command and control, credential capture, escalating privileges, internal reconnaissance, lateral motion, network mapping, data exfiltration, maintaining persistence, and related behaviors; and the interaction engine 106 is used so that network defender actors can take actions in the interactive CBS environment, including but not limited to, blocking a device from communicating, blocking ports to stop an exfiltration, removing users or removing privileges of users, and killing processes. For virtual, real, or combinations of the two, the CBS can be used to enact what-if hypothetical scenarios within a virtual environment or augmenting an actual environment. Similarly, network defenders can practice network defense against virtual or real cyber actors in an interactive CBS environment.

In some embodiments, the simulation engine 115 is used to generate multiple simulated CBS involving simulated virtual cyber actors engaging in behavior, such as, but not limited to, initial reconnaissance, scanning, initial compromise, establishing a foothold, beaconing, command and control, credential capture, escalating privileges, internal reconnaissance, lateral motion, network mapping, data exfiltration, maintaining persistence, and related behaviors; and the interaction engine 106 is used so that network defender actors can take actions in the interactive CBS environment, including but not limited to, blocking or re-directing a device from communicating, blocking ports to stop an exfiltration, removing or re-directing users or removing privileges of users, and killing processes. In this way, network defenders can practice cyber mitigation techniques in a virtual environment. When there is actual cyber activity of a malicious nature in the CBS, network defenders can quickly understand the potential effects of their mitigation actions, before these actions are actually performed. Network defenders can practice network defense against virtual cyber actors in an interactive CBS environment while an actual cyber attack is underway in order to reduce the risk and increase the likelihood that the defense and other actions performed are likely to achieve the desired outcome. In some embodiments, these simulations can be played in faster than real time enabling network defenders to more quickly work scenarios and actions that lead to better outcomes more quickly and efficiently. For virtual, real, or combinations of the two, the CBS can be used to enact what-if hypothetical scenarios within a virtual environment or augmenting an actual environment. Similarly, network defenders can practice network defense against virtual or real cyber actors in an interactive CBS environment.

In some embodiments, actors can zoom in or zoom out using the multiscale structure and maps that are part of the CBS; focus their view on certain classes of entities, systems, flows or processes; or, annotate the interactive CBS environment with notes, images, and dashboards. In this way, actors can get a better understanding of the environment.

In some embodiments, actual cyber actors can communicate with each other within the interactive CBS environment in order to coordinate better their defense actions.

In some embodiments, the simulation engine 115 is used to generate multiple simulated CBS involving simulated virtual cyber actors engaging in behavior, such as, but not limited to, initial reconnaissance, scanning, initial compromise, establishing a foothold, beaconing, command and control, credential capture, escalating privileges, internal reconnaissance, lateral motion, network mapping, data exfiltration, maintaining persistence, and related behaviors. Using these multiple simulations of CBS, risk computations of entities in a CBS can be computed in several different ways, including, but not limited to, using Monte Carlo methods or Bayesian methods. In this way, a risk score can be assigned to all entities in a CBS. Similarly, these methods can also be used to compute a diversity score.

In some embodiments, the analytic workflow engine 114 is used to compute lower dimensional tensor approximations of the data in CBS. The simulation engine 115 is then used with these lower dimensional tensor approximations to generate multiple simulated CBS involving simulated virtual cyber actors engaging in behavior, such as, but not limited to, initial reconnaissance, scanning, initial compromise, establishing a foothold, beaconing, command and control, credential capture, escalating privileges, internal reconnaissance, lateral motion, network mapping, data exfiltration, maintaining persistence, and related behaviors. Using these multiple simulations of CBS, risk computations of entities in a CBS can be computed in several different ways, including, but not limited to, using Monte Carlo methods or Bayesian methods, In this way, a risk score can be assigned to all entities in a CBS. Similarly, these methods can also be used to compute a diversity score.

The diversity score is a quantification of the degree and amount of variety within an organization or across organizations. Variety can be increased by having different vendors for equipment, such as routers, firewalls, and computers. Variety can also be increased through different network configurations and topologies. Diversity is important for assessing the vulnerability of an organization or multiple organizations to attacks. For example, if an organization has a low diversity score, one type of attack could disrupt a large fraction of the organization. In contrast, an organization with a high diversity score would only have a small amount of the organization disrupted by the same attack. Similarly, across multiple organizations, high diversity scores would mean that not all organizations would be impacted to the same degree by the same type of attack.

Diversity scores can be stored as tensors. Tensors can uniquely capture a multiplicity of contributing aspects to the diversity score. The diversity score can be calculated by applying operators to previously computed tensors or collections of tensors. The simulation engine 115 can be used to derive and explore multiple configurations within or across organizations. The results of the simulations can be stored in tensors or collections of tensors that are then used to compute a diversity score.

Risk scores, similar to diversity scores, are a quantification of the degree and amount of risk of an attack within an organization or across organizations. As previously discussed, the diversity score is a significant contributor to the risk score. Risk scores can also be stored as tensors. The risk score can be calculated by applying operators to previously computed tensors or collections of tensors. Simulations can also be used to derive and explore risk within or across organizations. The results of the simulations can be stored in tensors or collections of tensors that are then used to compute a risk score.

In some embodiments, diversity scores and risk scores are updated as updated cyber data, sensor data, enrichment data, and/or third party data is provided to the CBS manager 102, which creates new updated simulated CBS, which are in turn used to compute updated risk scores for all the entities in the CBS.

The resultant diversity and risk tensors can also be securely shared across multiple geographically dispersed locations using CBX 117 for information sharing and to update the shared CBS environments 401.

In some embodiments, first a collection of CBS are created, each with a different calculated level of diversity of the entities in the CBS and their characteristics, including, but not limited to, their operating systems, their configurations, their software libraries and software utilities, their software applications, and their interfaces. For each such CBS, the simulation engine 115 is used to generate multiple simulated CBS involving simulated virtual cyber actors engaging in behavior, such as, but not limited to, initial reconnaissance, scanning, initial compromise, establishing a foothold, beaconing, command and control, credential capture, escalating privileges, internal reconnaissance, lateral motion, network mapping, data exfiltration, maintaining persistence, and related behaviors. Using these multiple simulations of CBS, risk computations of entities for a given level of diversity are computed using, for example, Monte Carlo methods or Bayesian methods. In this way, the relationship between diversity and risk scores of entities in a CBS can be understood by network defenders and used to reduce the risk scores of entities in a CBS.

In some embodiments, the analytic workflow engine 114 is used to compute lower rank tensor approximations of the data in CBS. Next, a collection of CBS in these lower rank tensor approximations are created, each with a different calculated level of diversity of the entities in the CBS and their characteristics, including, but not limited to, their operating systems, their configurations, their software libraries and software utilities, their software applications, and their interfaces. For each such CBS, the simulation engine is used to generate multiple simulated CBS involving simulated virtual cyber actors engaging in behavior, such as, but not limited to, initial reconnaissance, scanning, initial compromise, establishing a foothold, beaconing, command and control, credential capture, escalating privileges, internal reconnaissance, lateral motion, network mapping, data exfil-tration, maintaining persistence, and related behaviors. Using these multiple simulations of CBS, risk computations of entities for a given level of diversity are computed using, for example, Monte Carlo methods or Bayesian methods. In this way, the relationship between diversity and risk scores of entities in a CBS can be understood by network defenders and used to reduce the risk scores of entities in a CBS.

OT Environments

In some embodiments, the sensor and cyber data may come from data in an operational technology (OT) environment. An OT environment refers to hardware sensors and software designed to monitor and control physical machines and physical processes, such as in, but not limited to, an industrial environment.

Figure 7:
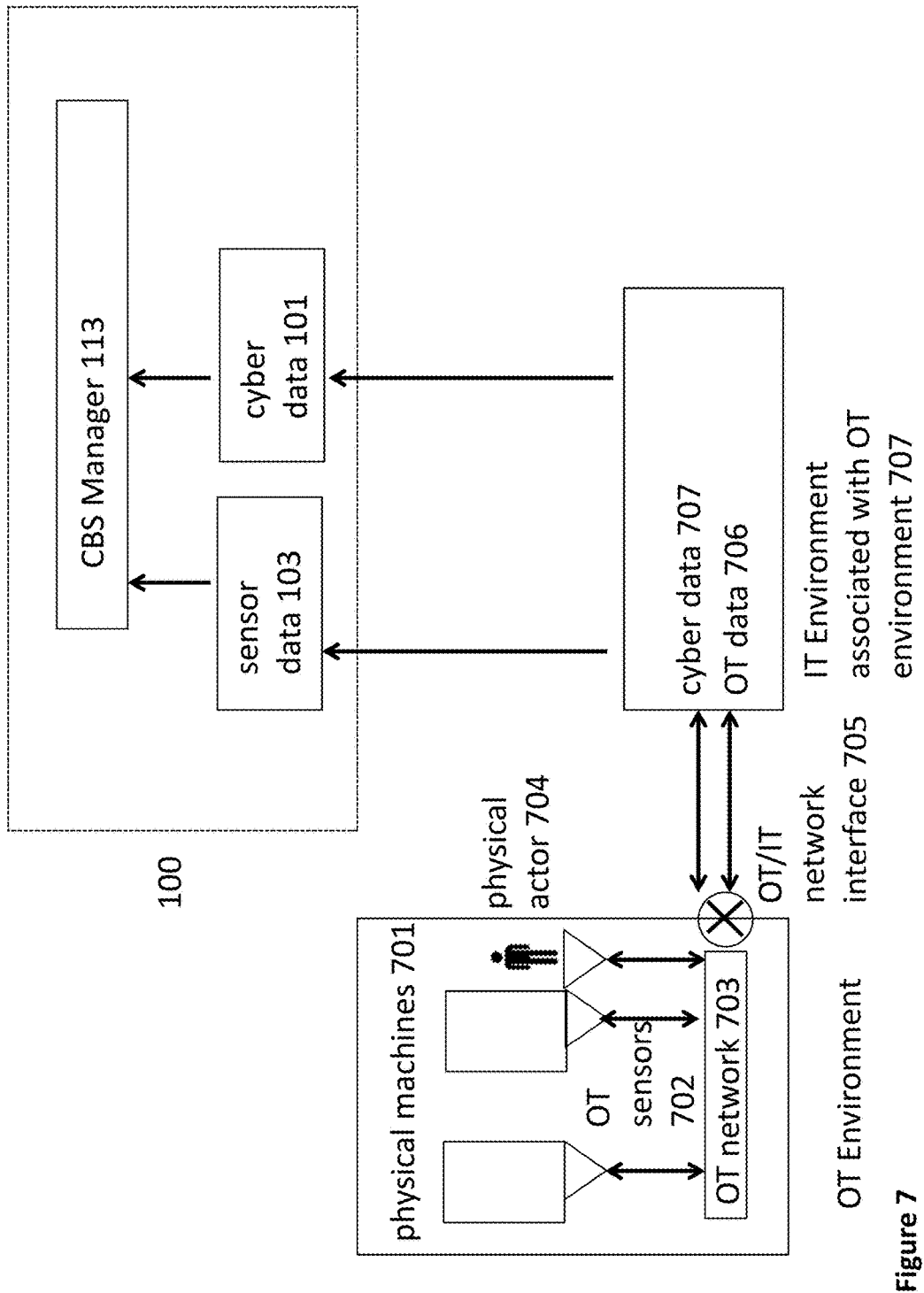
FIG. 7 is a system diagram showing a cybersecurity system interacting with an operational technology environment, according to some embodiments of the present disclosure.

FIG. 7 is a system diagram showing a cybersecurity system interacting with an operational technology environment, according to some embodiments of the present disclosure.

The physical machines 701 are monitored by OT sensors 702 and the data is passed to an OT network 703. OT sensors 702 also monitor physical actors 704 that interact and adjust the physical machines 701. OT sensors 702 collect data about the status, operations, interactions, internal conditions, external conditions, internal state, performance, and related data about machines and devices. OT sensors 702 also collect data about physical environments, including environmental conditions and changes, presence of humans, and related data. OT sensors are attached to machines and devices with wires, connected to machines and devices via the OT network, connected to the machines and devices via the IT network, or distributed through the physical environment. The OT data is encapsulated into standard network packets in an OT/IT network interface 705, where it is available for processing by an IT environment 707 associated with the OT environment 705. The various IT components in the IT environment 707, including the OT/IT interface 705 can be monitored or can produce log files creating cyber data 707, which are in turn available to the cybersecurity security system as one example of cyber data 101 in some embodiments. In some embodiments, the sensor data 706, encapsulated in network packets or log files, is available as one of the inputs 103 to the cybersecurity system. The sensor data 103 and the cyber data 101 is then processed by the CBS manager 113 as described above.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer, wearable device, heads up display, goggles, retinal devices having a display device or mechanism, e.g., a CRT (cathode ray tube), laser projection device, LCD (liquid crystal display), LED (Light-Emitting Diode) or OLED (Organic Light-Emitting Diode) monitor, for displaying information to the user and a keyboard and a pointing device, (e.g., a mouse or a trackball), by which the user can provide input to the computer or device. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A cybersecurity system for managing cyber behavior associated with cyber actors such that the cyber behavior can be computed and predicted and cyber interactions between the cyber actors can be created, the system comprising:
   a cyber behavioral space management module;
   an interaction engine;
   an analytic workflow engine; and
   a visualization engine,
   the cyber behavioral space management module, in communication with the interaction engine, the analytic workflow engine, and the visualization engine, and configured to:
      receive at least one of:
         input data, the input data including at least one of input cyber data, sensor data, enrichment data, and third party data,
         data from the interaction engine, and
         data from the analytic workflow engine;
      generate a plurality of cyber behavioral spaces based on the at least one of the input data, the data from the interaction engine, and the data from the analytic workflow engine, each of the plurality of cyber behavioral spaces comprising cyber behavioral space data, the cyber behavioral space data including:
         cyber data, the cyber data including at least one of the input cyber data and transformed input cyber data,
         cyber actor data associated with a plurality of cyber actors, and
         cyber scene data associated with a plurality of cyber scenes,
      the cyber behavioral space data being defined by a plurality of dimensions, a plurality of modes, and a plurality of scales;
   the interaction engine configured to:
      receive first cyber actor data associated with a first cyber actor of the plurality of cyber actors, the first cyber actor including at least one of a real cyber actor and a simulated actor,
      process the received first cyber actor data to facilitate at least one of:
         a first interaction between the first cyber actor with at least one of:

the cyber behavioral space,
the cyber scene, and
a cyber map, the cyber map associated with at least one of the plurality of cyber behavioral spaces, and
a second interaction between the first cyber actor with a second cyber actor of the plurality of cyber actors, and
transmit data associated with at least one of the first interaction and the second interaction;
the analytic workflow engine configured to:
analyze the cyber behavioral space data associated with each of the plurality of cyber behavioral spaces to compute cyber behaviors, and
update at least one of the cyber data, the cyber actor data, and the cyber scene data based on at least one of:
the cyber behavioral space data,
the computed cyber behaviors and an assignment of the computed cyber behaviors to at least one of the cyber data, the cyber actor data, and
the cyber scene data,
the first interaction, and
the second interaction, and
transmit data associated with the updated at least one of the cyber data, the cyber actor data, and the cyber scene data;
the visualization engine configured to:
compute visualizations of at least one of:
the data associated with at least one of the first interaction and the second interaction from the interaction engine, and
at least one of the cyber behavioral spaces, the plurality of cyber actors, the plurality of cyber scenes, the plurality of cyber maps, and the computed cyber behaviors, and
transmit the visualizations for display.

2. The cybersecurity system of claim 1, further comprising:
a query engine, in communication with the cyber behavioral space management module, the query engine configured to receive, from the first cyber actor, a query about at least one of the plurality of cyber behavioral spaces, the query associated with at least one of:
risk associated with a first cyber entity of a plurality of cyber entities;
a group of cyber entities of the plurality of cyber entities with a similar profile as the first cyber entity;
internal or external organizational constructs; and
behavior associated at least one of the first cyber entity, each cyber entity in the group of cyber entities, the first cyber actor, the second cyber actor and a third cyber actor; and
wherein the analytic workflow engine is further configured to compute and continuously update risks associated with each cyber entity of the plurality of cyber entities and each cyber actor of the plurality of cyber actors.

3. The cybersecurity system of claim 1, further comprising a simulation engine, in communication with the cyber behavioral space management module, configured to generate the plurality of cyber scenes, each of the plurality of cyber scenes including a subset of the cyber data and the cyber maps associated with the plurality of cyber behavioral spaces.

4. The cybersecurity system of claim 3, wherein the simulation engine is further configured to generate simulations, the simulations configured to:
operate on at least one of real world data and simulated data; and
provide a course of action for at least one of operations, analysis, insight, planning, training, a remediation action, and a mitigation action.

5. The cybersecurity system of claim 1, wherein the analytic workflow engine is further configured to:
create a transformed cyber behavioral space, wherein to create the transformed cyber behavioral space, the analytic workflow engine is further configured to:
transform the cyber behavioral space data into tensor data and lower rank tensor approximations; and
use machine learning to define cyber behaviors and the plurality of cyber behavioral spaces associated with the transformed cyber behavioral space.

6. The cybersecurity system of claim 5, wherein the analytic workflow engine is further configured to:
apply at least one of rules and machine learning to the transformed cyber behavioral space to define cyber behaviors that increase or decrease risk associated with at least one of:
a real cyber actor or a simulated actor;
a cyber entity;
a machine;
an organization; and
a process.

7. The cybersecurity system of claim 6, wherein the cybersecurity system is associated with a first organization, further wherein the cyber behaviors that increase or decrease risk are observable by cyber actors associated with the first organization and unobservable by cyber actors associated with a second organization, the cybersecurity system further comprising:
a cyber behavioral exchange engine, the cyber behavioral exchange engine in communication with the cyber behavioral space management module, the cyber behavioral exchange engine configured to:
transmit the cyber behaviors that increase or decrease risk to a cyber behavioral exchange engine associated with the second organization using at least one of a privacy preserving distributed machine learning algorithm and a privacy preserving communications protocol such that the cyber behaviors that increase or decrease risk can be used to analyze data in the second organization, and the cyber behavioral space data associated with the first organization is unobservable by cyber actors associated with the second organization.

8. The cybersecurity system of claim 5, wherein the first cyber actor data is further processed to:
determine at least one of:
a first cyber behavior of the cyber behaviors associated with the transformed cyber behavioral space, and
a first cyber scene of the plurality of cyber scenes associated with the transformed cyber behavioral space; and
improve operational capabilities, readiness, and training associated with responding to the first cyber behavior and the first cyber scene.

9. The cybersecurity system of claim 1, wherein the analytic workflow engine is further configured to process at least one of packet data, network traffic, computer logs, signals intelligence, visible, infrared, multi-spectral, hyperspectral, synthetic aperture radar, moving target indicator radar, technical intelligence data, and intelligence reports.

10. The cybersecurity system of claim 1, wherein each of the plurality of cyber behavioral spaces include at least one of a real-time cyber behavioral space, a historical cyber behavioral space, and a simulated cyber behavioral space.

11. The cybersecurity system of claim 1, wherein the cyber behavior includes at least one of initial reconnaissance, scanning, initial compromise, establishing a foothold, beaconing, command and control, credential capture, escalating privileges, internal reconnaissance, lateral motion, network mapping, data exfiltration, maintaining persistence, and related behaviors.

12. The cybersecurity system of claim 1, wherein:
the plurality of dimensions include a combination of source and destination addresses, time of arrival, volume, packet size, and a protocol type;
the plurality of modes include a combination of packet data, network traffic, computer logs, signals intelligence, visible, infrared, multi-spectral, hyperspectral, synthetic aperture radar, moving target indicator radar, technical intelligence data, and intelligence reports; and
the plurality of scales include a combination of temporal multi-scale data and geo-spatial data.

13. A cybersecurity system for managing cyber behavior associated with cyber actors such that the cyber behavior can be computed and predicted and cyber interactions between the cyber actors can be created, the system comprising:
a cyber behavioral space management module;
an interaction engine;
an analytic workflow engine; and
a visualization engine;
the cyber behavioral space management module, in communication with the interaction engine, the analytic workflow engine, and the visualization engine, and configured to:
receive sensor data, the sensor data including at least one of physical actor sensor data about a physical actor and physical system sensor data about a physical system, and at least one of:
input data, the input data including at least one of input cyber data, enrichment data, and third party data,
data from the interaction engine, and
data from the analytic workflow engine;
generate a plurality of cyber behavioral spaces based on the sensor data and at least one of the input data, the data from the interaction engine, and the data from the analytic workflow engine, each of the plurality of cyber behavioral spaces comprising cyber behavioral space data, the cyber behavioral space data including:
cyber data, the cyber data including at least one of the input cyber data and transformed input cyber data,
cyber actor data associated with a plurality of cyber actors, and
cyber scene data associated with a plurality of cyber scenes,
the cyber behavioral space data being defined by a plurality of dimensions, a plurality of modes, and a plurality of scales;
the interaction engine configured to:
receive first cyber actor data associated with a first cyber actor of the plurality of cyber actors, the first cyber actor including at least one of a real cyber actor and a simulated actor,
process the received first cyber actor data to facilitate at least one of:
a first interaction between the first cyber actor with at least one of:
the cyber behavioral space,
the cyber scene, and
a cyber map, the cyber map associated with at least one of the plurality of cyber behavioral spaces, and
a second interaction between the first cyber actor with a second cyber actor of the plurality of cyber actors, and
transmit data associated with at least one of the first interaction and the second interaction,
the analytic workflow engine configured to:
analyze the cyber behavioral space data associated with each of the plurality of cyber behavioral spaces to compute cyber behaviors, and update at least one of the cyber data, the cyber actor data, and the cyber scene data based on at least one of:
the cyber behavioral space data,
the computed cyber behaviors and an assignment of the computed cyber behaviors to at least one of the cyber data, the cyber actor data, and
the cyber scene data,
the first interaction,
the second interaction, and
a computation of physical behaviors about at least one of the physical system and the physical actor, and
transmit data associated with the updated at least one of the cyber data, the cyber actor data, and the cyber scene data;
the visualization engine configured to:
compute visualizations of at least one of:
the data associated with at least one of the first interaction and the second interaction from the interaction engine, and
at least one of the cyber behavioral spaces, the plurality of cyber actors, the plurality of cyber scenes, the plurality of cyber maps, and the computed cyber behaviors, and
transmit the visualizations for display.

14. The cybersecurity system of claim 13, further comprising:
a query engine, in communication with the cyber behavioral space management module, the query engine configured to receive, from the first cyber actor, a query about at least one of the plurality of cyber behavioral spaces, the query associated with at least one of:
risk associated with a first cyber entity of a plurality of cyber entities;
a group of cyber entities of the plurality of cyber entities with a similar profile as the first cyber entity;
internal or external organizational constructs; and
behavior associated at least one of the first cyber entity, each cyber entity in the group of cyber entities, the first cyber actor, the second cyber actor and a third cyber actor; and
wherein the analytic workflow engine is further configured to compute and continuously update risks associated with each cyber entity of the plurality of cyber entities and each cyber actor of the plurality of cyber actors.

15. The cybersecurity system of claim 13 further comprising a simulation engine, in communication with the cyber behavioral space management module, the simulation engine configured to generate the plurality of cyber scenes, each of the plurality of cyber scenes including a subset of the cyber data, the cyber scenes, and the cyber maps associated with the plurality of cyber behavioral spaces.

16. The cybersecurity system of claim 15, wherein the simulation engine is further configured to generate simulations, the simulations configured to:
   operate on at least one of real world data and simulated data; and
   provide a course of action for at least one of operations, analysis, insight, planning, training, a remediation action, and a mitigation action.

17. The cybersecurity system of claim 13, wherein the analytic workflow engine is further configured to:
   create a transformed cyber behavioral space, wherein to create the transformed cyber behavioral space, the analytic workflow engine is further configured to:
      transform the cyber behavioral space data into tensor data and lower rank tensor approximations; and
      use machine learning to define cyber behaviors and the plurality of cyber behavioral spaces associated with the transformed cyber behavioral space.

18. The cybersecurity system of claim 17, wherein the analytic workflow engine is further configured to:
   apply at least one of rules and machine learning to the transformed cyber behavioral space to define cyber behaviors that increase or decrease risk associated with at least one of:
      a real cyber actor or a simulated actor;
      a cyber entity;
      a machine;
      an organization; and
      a process.

19. The cybersecurity system of claim 18, wherein the cybersecurity system is associated with a first organization, further wherein the cyber behaviors that increase or decrease risk are observable by cyber actors associated with the first organization and unobservable by cyber actors associated with a second organization, the cybersecurity system further comprising:
   a cyber behavioral exchange engine, the cyber behavioral exchange engine in communication with the cyber behavioral space management module, the cyber behavioral exchange engine configured to:
      transmit the cyber behaviors that increase or decrease risk to a cyber behavioral exchange engine associated with the second organization using at least one of a privacy preserving distributed machine learning algorithm and a privacy preserving communications protocol such that the cyber behaviors that increase or decrease risk can be used to analyze data in the second organization, and the cyber behavioral space data associated with the first organization is unobservable by cyber actors associated with the second organization.

20. The cybersecurity system of claim 17, wherein the first cyber actor data is further processed to:
   determine at least one of:
      a first cyber behavior of the cyber behaviors associated with the transformed cyber behavioral space, and
      a first cyber scene of the plurality of cyber scenes associated with the transformed cyber behavioral space; and
      improve operational capabilities, readiness, and training associated with responding to the first cyber behavior and the first cyber scene.

21. The cybersecurity system of claim 13, wherein the analytic workflow engine is further configured to process at least one of data from operational technology (OT) sensors, operational technology logs, packet data, network traffic, computer logs, signals intelligence, visible, infrared, multi-spectral, hyperspectral, synthetic aperture radar, moving target indicator radar, technical intelligence data, and intelligence reports.

22. The cybersecurity system of claim 13, wherein each of the plurality of cyber behavioral spaces include at least one of a real-time cyber behavioral space, a historical cyber behavioral space, and a simulated cyber behavioral space.

23. The cybersecurity system of claim 13, wherein the cyber behavior includes at least one of initial reconnaissance, scanning, initial compromise, establishing a foothold, beaconing, command and control, credential capture, escalating privileges, internal reconnaissance, lateral motion, network mapping, data exfiltration, maintaining persistence, and related behaviors.

24. The cybersecurity system of claim 13, wherein:
   the plurality of dimensions include a combination of source and destination addresses, time of arrival, volume, packet size, and a protocol type;
   the plurality of modes include a combination of packet data, network traffic, computer logs, signals intelligence, visible, infrared, multi-spectral, hyperspectral, synthetic aperture radar, moving target indicator radar, technical intelligence data, and intelligence reports; and
   the plurality of scales include a combination of temporal multi-scale data and geo-spatial data.

* * * * *